US012340709B2

(12) United States Patent
Ramani et al.

(10) Patent No.: US 12,340,709 B2
(45) Date of Patent: Jun. 24, 2025

(54) ADAPTIVE TUTORING SYSTEM FOR MACHINE TASKS IN AUGMENTED REALITY

(71) Applicant: Purdue Research Foundation, West Lafayette, IN (US)

(72) Inventors: Karthik Ramani, West Lafayette, IN (US); Gaoping Huang, West Lafayette, IN (US); Alexander J Quinn, West Lafayette, IN (US); Yuanzhi Cao, Redmond, WA (US); Tianyi Wang, West Lafayette, IN (US); Xun Qian, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 856 days.

(21) Appl. No.: 17/517,949

(22) Filed: Nov. 3, 2021

(65) Prior Publication Data

US 2022/0139254 A1    May 5, 2022

Related U.S. Application Data

(60) Provisional application No. 63/162,108, filed on Mar. 17, 2021, provisional application No. 63/109,154, filed on Nov. 3, 2020.

(51) Int. Cl.
*G09B 5/02* (2006.01)
*G06N 20/00* (2019.01)
(Continued)

(52) U.S. Cl.
CPC ......... *G09B 19/0069* (2013.01); *G06N 20/00* (2019.01); *G06T 13/40* (2013.01);
(Continued)

(58) Field of Classification Search
None
See application file for complete search history.

(56) References Cited

U.S. PATENT DOCUMENTS

2012/0075343 A1\* 3/2012 Chen .................. G06T 7/73
345/633
2018/0315329 A1\* 11/2018 D'Amato ............. G09B 5/02
(Continued)

OTHER PUBLICATIONS

Balasaravanan Thoravi Kumaravel, Fraser Anderson, George Fitzmaurice, Bjoern Hartmann, and Tovi Grossman. 2019. Loki: Facilitating Remote Instruction of Physical Tasks Using Bi-Directional Mixed-Reality Telepresence. In Proceedings of the 32nd Annual ACM Symposium on User Interface Software and Technology (New Orleans, LA, USA) (UIST '19). Association for Computing Machinery, New York, NY, USA, 161-174. https://doi.org/10.1145/3332165.3347872.

(Continued)

*Primary Examiner* — James B Hull
(74) *Attorney, Agent, or Firm* — Maginot, Moore & Beck LLP

(57) ABSTRACT

A machine task tutorial system is disclosed that utilizes augmented reality to enable an expert user to record a tutorial for a machine task that can be learned by different trainee users in an adaptive manner. The machine task tutorial system advantageously utilizes an adaptation model that focuses on spatial and bodily visual presence for machine task tutoring. The machine task tutorial system advantageously enables adaptive tutoring in the recorded-tutorial environment based on machine state and user activity recognition. The machine task tutorial system advantageously utilizes AR to provide tutorial recording, adaptive visualization, and state recognition. In this way, the machine task tutorial system supports more effective apprenticeship and training for machine tasks in workshops or factories.

19 Claims, 15 Drawing Sheets

(51) Int. Cl.
   G06T 13/40      (2011.01)
   G06T 19/00      (2011.01)
   G06V 10/25      (2022.01)
   G06V 40/20      (2022.01)
   G09B 19/00      (2006.01)
   G09B 19/24      (2006.01)

(52) U.S. Cl.
   CPC ............ *G06T 19/006* (2013.01); *G06V 10/25* (2022.01); *G06V 40/23* (2022.01); *G09B 5/02* (2013.01); *G09B 19/24* (2013.01); *G06T 2210/36* (2013.01)

(56) References Cited

U.S. PATENT DOCUMENTS

2019/0316912 A1*  10/2019  Maggiore .............. G06F 9/453
2021/0035333 A1*   2/2021  Wright ................. G06V 20/20

OTHER PUBLICATIONS

Balasaravanan Thoravi Kumaravel, Cuong Nguyen, Stephen DiVerdi, and Björn Hartmann. 2019. TutoriVR: A Video-Based Tutorial System for Design Applications in Virtual Reality. In Proceedings of the 2019 CHI Conference on Human Factors in Computing Systems. 1-12.

Unity. 2019. Unity Real-Time Development Platform. Retrieved Sep. 1, 2019 from https://unity.com/.

Kurt VanLehn. 2011. The relative effectiveness of human tutoring, intelligent tutoring systems, and other tutoring systems. Educational Psychologist 46, 4 (2011), 197-221. https://doi.org/10.1080/00461520.2011.611369.

Anne Wegerich and Matthias Rötting. 2011. A Context-Aware Adaptation System for Spatial Augmented Reality. In Digital Human Modeling, Vincent G. Duffy (Ed.). Springer Berlin Heidelberg, Berlin, Heidelberg, 417-425.

Giles Westerfield, Antonija Mitrovic, and Mark Billinghurst. 2015. Intelligent Augmented Reality Training for Motherboard Assembly. International Journal of Artificial Intelligence in Education 25, 1 (2015), 157-172. https://doi.org/10.1007/ s40593-014-0032-x.

Frederik Winther, Linoj Ravindran, Kasper Paabøl Svendsen, and Tiare Feuchtner. 2020. Design and Evaluation of a VR Training Simulation for Pump Maintenance Based on a Use Case at Grundfos. In IEEE VR 2020. IEEE.

Li Da Xu, Eric L Xu, and Ling Li. 2018. Industry 4.0: state of the art and future trends. International Journal of Production Research 56, 8 (2018), 2941-2962.

M. Yamashita and S. Sakane. 2001. Adaptive annotation using a human-robot interface system PARTNER. In Proceedings 2001 ICRA. IEEE International Conference on Robotics and Automation (Cat. No.01CH37164), vol. 3. 2661-2667 vol.3.

Z. Zhu, V. Branzoi, M. Wolverton, G. Murray, N. Vitovitch, L. Yarnall, G. Acharya, S. Samarasekera, and R. Kumar. 2014. ARmentor: Augmented reality based mentoring system. In 2014 IEEE International Symposium on Mixed and Augmented Reality (ISMAR). 17-22.

Paula Martiskainen, Mikko Järvinen, Jukka-Pekka Skön, Jarkko Tiirikainen, Mikko Kolehmainen, and Jaakko Mononen 2009. Cow behaviour pattern recognition using a three-dimensional accelerometer and support vector machines. Applied animal behaviour science 119, 1-2 (2009), 32-38.

Dominic Gorecky, Mathias Schmitt, Matthias Loskyll, and Detlef Zühlke. 2014. Human-machine-interaction in the industry 4.0 era. In 2014 12th IEEE international conference on industrial informatics (INDIN). IEEE, 289-294.

Ping-Hsuan Han, Yang-Sheng Chen, Yilun Zhong, Han-Lei Wang, and Yi-Ping Hung. 2017. My Tai-Chi Coaches: An Augmented-Learning Tool for Practicing Tai-Chi Chuan. In Proceedings of the 8th Augmented Human International Conference (Silicon Valley, California, USA) (AH '17). Association for Computing Machinery, New York, NY, USA, Article 25, 4 pages. https://doi.org/10.1145/3041164.3041194.

Bradley Herbert, Barrett Ens, Amali Weerasinghe, Mark Billinghurst, and Grant Wigley. 2018. Design considerations for combining augmented reality with intelligent tutors. Computers and Graphics (Pergamon) 77 (2018), 166-182. https://doi.org/10.1016/j.cag.2018.09.017.

Shaun W. Lawson and John R. G. Pretlove. 1998. Augmented reality for underground pipe inspection and maintenance. In Telemanipulator and Telepresence Technologies V, Matthew R. Stein (Ed.), vol. 3524. International Society for Optics and Photonics, SPIE, 98-104. https://doi.org/10.1117/12.333673 AdapTutAR: An Adaptive Tutoring System for Machine Tasks in Augmented Reality CHI '21, May 8-13, 2021, Yokohama, Japan.

D. Rodenburg, P. Hungler, S. A. Etemad, D. Howes, A. Szulewski, and J. Mclellan. 2018. Dynamically adaptive simulation based on expertise and cognitive load. In 2018 IEEE Games, Entertainment, Media Conference (GEM). 1-6.

S. Yonemoto. 2013. Seamless Annotation Display for Augmented Reality. In 2013 International Conference on Cyberworlds. 387-387.

J. Zhu, S.K. Ong, and A.Y.C. Nee. 2015. A context-aware augmented reality assisted maintenance system. International Journal of Computer Integrated Manufacturing 28, 2 (2015), 213-225. https://doi.org/10.1080/0951192X.2013.874589.

2020. Oculus. https://www.oculus.com/.

Andrea F. Abate, Vincenzo Loia, Michele Nappi, Stefano Ricciardi, and Enrico Boccola. 2008. ASSYST: Avatar baSed SYStem mainTenance. 2008 IEEE Radar Conference, RADAR 2008 1 (2008). https://doi.org/10.1109/RADAR.2008.4720962.

M. Beyyoudh, M. K. Idrissi, and S. Bennani. 2018. A new approach of designing an intelligent tutoring system based on adaptive workflows and pedagogical games. In 2018 17th International Conference on Information Technology Based Higher Education and Training (ITHET). 1-7. https://doi.org/10.1109/ITHET.2018.8424619.

Andrew Thomas Bimba, Norisma Idris, Ahmed Al-Hunaiyyan, Rohana Binti Mahmud, and Nor Liyana Bt Mohd Shuib. 2017. Adaptive feedback in computerbased learning environments: a review. Adaptive Behavior 25, 5 (2017), 217- 234. https://doi.org/10.1177/1059712317727590.

Peter Brusilovsky and Hoah-Der Su. 2002. Adaptive Visualization Component of a Distributed Web-Based Adaptive Educational System. In Intelligent Tutoring Systems, Stefano A. Cerri, Guy Gouardères, and Fàbio Paraguaçu (Eds.). Springer Berlin Heidelberg, Berlin, Heidelberg, 229-238.

Alisa Burova, John Mäkelä, Jaakko Hakulinen, Tuuli Keskinen, Hanna Heinonen, Sanni Siltanen, and Markku Turunen. 2020. Utilizing VR and Gaze Tracking to Develop AR Solutions for Industrial Maintenance. In Proceedings of the 2020 CHI Conference on Human Factors in Computing Systems. 1-13.

Yuanzhi Cao, Xun Qian, Tianyi Wang, Rachel Lee, Ke Huo, and Karthik Ramani. [n.d.]. An Exploratory Study of Augmented Reality Presence for Tutoring Machine Tasks. In Proceedings of the 2020 CHI Conference on Human Factors in Computing Systems (Honolulu, Hi, USA, 2020-04-21) (CHI '20). Association for Computing Machinery, 1-13. https://doi.org/10.1145/3313831.3376688.

Jean-Rémy Chardonnet, Guillaume Fromentin, and José Outeiro. 2017. Augmented reality as an aid for the use of machine tools. In 15th Management and Innovative Technologies (MIT) Conference. Sinaia, Romania, 1-4. https: //hal.archives-ouvertes.fr/hal-01598613.

Pei-Yu Chi, Sally Ahn, Amanda Ren, Mira Dontcheva, Wilmot Li, and Björn Hartmann. 2012. MixT: automatic generation of step-by-step mixed media tutorials. In Proceedings of the 25th annual ACM symposium on User interface software and technology. 93-102.

Albert T. Corbett, Kenneth R. Koedinger, and John R. Anderson. 1997. Chapter 37—Intelligent Tutoring Systems. In Handbook of Human-Computer Interaction (Second Edition) (second edition ed.), Marting G. Helander, Thomas K. Landauer, and Prasad V. Prabhu (Eds.). North-Holland, Amsterdam, 849-874. https: //doi.org/10.1016/B978-044481862-1.50103-5.

(56) References Cited

OTHER PUBLICATIONS

F. De Crescenzio, M. Fantini, F. Persiani, L. Di Stefano, P. Azzari, and S. Salti. 2011. Augmented Reality for Aircraft Maintenance Training and Operations Support. IEEE Computer Graphics and Applications 31, 1 (2011), 96-101.
Paula J. Durlach. 2019. Fundamentals, Flavors, and Foibles of Adaptive Instructional Systems. In Adaptive Instructional Systems, Robert A. Sottilare and Jessica Schwarz (Eds.). Springer International Publishing, Cham, 76-95.
Pavel Dvorak, Radovan Josth, and Elisabetta Delponte. 2017. Object State Recognition for Automatic AR-Based Maintenance Guidance. In 2017 IEEE Conference on Computer Vision and Pattern Recognition Workshops (CVPRW). 1244-1250. https://doi.org/10.1109/CVPRW.2017.164 ISSN: 2160-7516.
Andreas Fender, Philipp Herholz, Marc Alexa, and Jörg Muller. 2018. OptiSpace: Automated Placement of Interactive 3D Projection Mapping Content. In Proceedings of the 2018 CHI Conference on Human Factors in Computing Systems (Montreal QC, Canada) (CHI '18). Association for Computing Machinery, New York, NY, USA, Article 269, 11 pages. https://doi.org/10.1145/3173574.3173843.
Andreas Fender, David Lindlbauer, Philipp Herholz, Marc Alexa, and Jörg Müller. 2017. HeatSpace: Automatic Placement of Displays by Empirical Analysis of User Behavior. In Proceedings of the 30th Annual ACM Symposium on User Interface Software and Technology (Québec City, QC, Canada) (UIST '17). Association for Computing Machinery, New York, NY, USA, 611-621. https://doi.org/10.1145/3126594.3126621.
Christoph Froschl. 2005. User modeling and user profiling in adaptive e-learning systems. Graz, Austria: Master Thesis (2005).
Markus Funk. 2016. Augmented reality at the workplace : a context-aware assistive system using in-situ projection. http://dx.doi.org/10.18419/opus-8997.
Benjamin Goldberg, Keith Brawner, and Robert Sottilare. 2012. Use of Evidencebased Strategies to Enhance the Extensibility of Adaptive Tutoring Technologies. Proceedings of the Interservice /Industry Training, Simulation, and Education Conference (I/ITSEC) 12288 (2012), 1-12. http://ntsa.metapress.com/index/QHM8976477503684.pdf.
Michihiko Goto, Yuko Uematsu, Hideo Saito, Shuji Senda, and Akihiko Iketani. 2010. Task support system by displaying instructional video onto AR workspace. In 2010 IEEE International Symposium on Mixed and Augmented Reality. IEEE, 83-90.
Fernando Gutierrez and John Atkinson. 2011. Adaptive feedback selection for intelligent tutoring systems. Expert Systems with Applications 38, 5 (2011), 6146-6152. https://doi.org/10.1016/j.eswa.2010.11.058.
Zhen-Yu He and Lian-Wen Jin. 2008. Activity recognition from acceleration data using AR model representation and SVM. In 2008 international conference on machine learning and cybernetics, vol. 4. IEEE, 2245-2250.
S. J. Henderson and S. Feiner. 2009. Evaluating the benefits of augmented reality for task localization in maintenance of an armored personnel carrier turret. In 2009 8th IEEE International Symposium on Mixed and Augmented Reality. 135-144.
S. J. Henderson and S. K. Feiner. 2011. Augmented reality in the psychomotor phase of a procedural task. In 2011 10th IEEE International Symposium on Mixed and Augmented Reality. 191-200. https://doi.org/10.1109/ISMAR.2011.6092386.
Jean-Michel Hoc. 2001. Towards a Cognitive Approach to Human-Machine Cooperation in Dynamic Situations. International Journal of Human-Computer Studies 54, 4 (2001), 509-540. https://doi.org/10.1006/ijhc.2000.0454.
Lars-Erik Janlert. 2014. The Ubiquitous Button. Interactions 21, 3 (May 2014), 26-33. https://doi.org/10.1145/2592234.
Karen Kear, Frances Chetwynd, Judith Williams, and Helen Donelan. 2012. Web conferencing for synchronous online tutorials: Perspectives of tutors using a new medium. Computers & Education 58, 3 (2012), 953-963.

Seungwon Kim, Gun Lee, Weidong Huang, Hayun Kim, Woontack Woo, and Mark Billinghurst. 2019. Evaluating the Combination of Visual Communication Cues for HMD-Based Mixed Reality Remote Collaboration. In Proceedings of the 2019 CHI Conference on Human Factors in Computing Systems (Glasgow, Scotland Uk) (CHI '19). Association for Computing Machinery, New York, NY, USA, 1-13. https://doi.org/10.1145/3290605.3300403.
A. Kotranza, D. Scott Lind, C. M. Pugh, and B. Lok. 2009. Real-time in-situ visual feedback of task performance in mixed environments for learning joint psychomotor-cognitive tasks. In 2009 8th IEEE International Symposium on Mixed and Augmented Reality. 125-134. https://doi.org/10.1109/ISMAR.2009.5336485.
Wallace S. Lages and Doug A. Bowman. 2019. Walking with Adaptive Augmented Reality Workspaces: Design and Usage Patterns. In Proceedings of the 24th International Conference on Intelligent User Interfaces (Marina del Ray, California) (IUI '19). Association for Computing Machinery, New York, NY, USA, 356-366. https://doi.org/10.1145/3301275.3302278.
Michael Laielli, James Smith, Giscard Biamby, Trevor Darrell, and Bjoern Hartmann. [n.d.]. LabelAR: A Spatial Guidance Interface for Fast Computer Vision Image Collection. In Proceedings of the 32nd Annual ACM Symposium on User Interface Software and Technology (New Orleans, LA, USA, Oct. 17, 2019) (UIST '19). Association for Computing Machinery, 987-998. https://doi.org/10.1145/3332165.3347927.
Jung Lee and O Park. 2008. Adaptive instructional systems. Handbook of research on educational communications and technology (2008), 469-484.
David Lindlbauer, Anna Maria Feit, and Otmar Hilliges. 2019. Context-Aware Online Adaptation of Mixed Reality Interfaces. In Proceedings of the 32nd Annual ACM Symposium on User Interface Software and Technology (New Orleans, LA, USA) (UIST '19). Association for Computing Machinery, New York, NY, USA, 147-160. https://doi.org/10.1145/3332165.3347945.
Matthias Loskyll, Ines Heck, Jochen Schlick, and Michael Schwarz. 2012. Contextbased orchestration for control of resource-efficient manufacturing processes. Future Internet 4, 3 (2012), 737-761.
Danielle L. Lusk, Amber D. Evans, Thomas R. Jeffrey, Keith R. Palmer, Chris S. Wikstrom, and Peter E. Doolittle. 2009. Multimedia learning and individual differences: Mediating the effects of working memory capacity with segmentation. British Journal of Educational Technology 40, 4 (2009), 636-651. https://doi.org/10.1111/j.1467-8535.2008.00848.x.
Stephen Maloney, Michael Storr, Sophie Paynter, Prue Morgan, and Dragan Ilic. 2013. Investigating the efficacy of practical skill teaching: a pilot-study comparing three educational methods. Advances in Health Sciences Education 18.1 (2013), 71-80.
Michael A Orey and Wayne A Nelson. 1993. Development principles for intelligent tutoring systems: Integrating cognitive theory into the development of computer-based instruction. Educational Technology Research and Development 41, 1 (1993), 59-72. https://doi.org/10.1007/BF02297092.
Philo Tan Chua, R. Crivella, B. Daly, Ning Hu, R. Schaaf, D. Ventura, T. Camill, J. Hodgins, and R. Pausch. 2003. Training for physical tasks in virtual environments: Tai Chi. In IEEE Virtual Reality, 2003. Proceedings. 87-94.
Thammathip Piumsomboon, Gun A. Lee, Jonathon D. Hart, Barrett Ens, Robert W. Lindeman, Bruce H. Thomas, and Mark Billinghurst. 2018. Mini-Me: An Adaptive Avatar for Mixed Reality Remote Collaboration. In Proceedings of the 2018 CHI Conference on Human Factors in Computing Systems (Montreal QC, Canada) (CHI '18). Association for Computing Machinery, New York, NY, USA, Article 46, 13 pages. https://doi.org/10.1145/3173574.3173620.
Thammathip Piumsomboon, Gun A. Lee, Andrew Irlitti, Barrett Ens, Bruce H. Thomas, and Mark Billinghurst. 2019. On the Shoulder of the Giant: A Multi-Scale Mixed Reality Collaboration with 360 Video Sharing and Tangible Interaction. In Proceedings of the 2019 CHI Conference on Human Factors in Computing Systems (Glasgow, Scotland Uk) (CHI '19). Association for Computing Machinery, New York, NY, USA, Article 228, 17 pages. https://doi.org/10.1145/3290605.3300458.

(56) References Cited

OTHER PUBLICATIONS

Shaoqing Ren, Kaiming He, Ross Girshick, and Jian Sun. [n.d.]. Faster R-CNN: Towards Real-Time Object Detection with Region Proposal Networks. In Advances in Neural Information Processing Systems 28, C. Cortes, N. D. Lawrence, D. D. Lee, M. Sugiyama, and R. Garnett (Eds.). Curran Associates, Inc., 91-99. http://papers.nips.cc/paper/5638-faster-r-cnn-towards-real-time-objectdetection-with-region-proposal-networks.pdf.

Alejandro Reyes, Osslan Vergara, Erasmo Bojórquez, Vianey Sánchez, and Manuel Nandayapa. 2016. A mobile augmented reality system to support machinery operations in scholar environments: A Mar System to Support Machinery Operations in Scholar Environments. Computer Applications in Engineering Education (Oct. 2016). https://doi.org/10.1002/cae.21772.

Mark Sandler, Andrew Howard, Menglong Zhu, Andrey Zhmoginov, and LiangChieh Chen. 2018. MobileNetV2: Inverted Residuals and Linear Bottlenecks. In Proceedings of the IEEE Conference on Computer Vision and Pattern Recognition (CVPR).

Eldon Schoop, Michelle Nguyen, Daniel Lim, Valkyrie Savage, Sean Follmer, and Björn Hartmann. 2016. Drill Sergeant: Supporting physical construction projects through an ecosystem of augmented tools. In Proceedings of the 2016 CHI Conference Extended Abstracts on Human Factors in Computing Systems. 1607-1614.

Marieke H.S.B. Smits, Jo Boon, Dominique M.A. Sluijsmans, and Tamara van Gog. 2008. Content and timing of feedback in a web-based learning environment: effects on learning as a function of prior knowledge. Interactive Learning Environments 16, 2 (2008), 183-193. https://doi.org/10.1080/10494820701365952.

Robert Sottilare and Keith Brawner. [n.d.]. Component Interaction within the Generalized Intelligent Framework for Tutoring ( GIFT ) as a Model for Adaptive Instructional System Standards Toward Standardization through Design Goals. ([n. d.]), 55-62.

Robert A. Sottilare, Benjamin Goldberg, Charles Ragusa, and Michael Hoffman. 2013. Characterizing an Adaptive Tutoring Learning Effect Chain for Individual and Team Tutoring. 13033 (2013), 1-13.

Lucy Suchman. 2007. Human Machine Reconfigurations Plans and Situated Actions (2 ed.). Cambridge University Press.

Alyssa Tanaka, Jeffrey Craighead, Glenn Taylor, and Robert Sottilare. 2019. Adaptive Learning Technology for AR Training: Possibilities and Challenges. In Adaptive Instructional Systems, Robert A. Sottilare and Jessica Schwarz (Eds.). Springer International Publishing, Cham, 142-150.

Markus Tatzgern, Valeria Orso, Denis Kalkofen, Giulio Jacucci, Luciano Gamberini, and Dieter Schmalstieg. 2016. Adaptive information density for augmented reality displays. Proceedings—IEEE Virtual Reality Jul. 2016, 83-92. http://dx.doi.org/10.1109/VR.2016.7504691 Adaptive information; Browser interfaces; Hierarchical clustering;Level of detail;Search tasks;Semantic attribute;User interaction;Visual clutter.

Andrea L. Thomaz and Cynthia Breazeal. 2008. Teachable robots: Understanding human teaching behavior to build more effective robot learners. Artificial Intelligence 172, 6-7 (2008), 716-737. https://doi.org/10.1016/j.artint.2007.09.009.

\* cited by examiner

| Level of Detail | Subtask Descriptions | Step Expectation Descriptions | Animated Components + Guidance Arrows | AR Avatars |
|---|---|---|---|---|
| LoD 5 | ✓ | ✓ | ✓ | ✓ |
| LoD 4 | ✓ | ✓ | ✓ | |
| LoD 3 | ✓ | ✓ | | |
| LoD 2 | ✓ | | | |
| LoD 1 | | | | |

FIG. 9

ADAPTIVE TUTORING SYSTEM FOR MACHINE TASKS IN AUGMENTED REALITY

This application claims the benefit of priority of U.S. provisional application Ser. No. 63/109,154, filed on Nov. 3, 2020 and of U.S. provisional application Ser. No. 63/162, 108, filed on Mar. 17, 2021, the disclosures of which are herein incorporated by reference in their entirety.

GOVERNMENT LICENSE RIGHTS

This invention was made with government support under contract number DUE 1839971 awarded by the National Science Foundation. The government has certain rights in the invention.

FIELD

The device and method disclosed in this document relates to augmented reality and, more particularly, to adaptive tutoring for machine tasks using augmented reality.

BACKGROUND

Unless otherwise indicated herein, the materials described in this section are not admitted to be the prior art by inclusion in this section.

Human workers are the most flexible part of the production process. In the ongoing trend known as Industry 4.0, workers are expected to operate diverse machinery and other equipment in constantly changing working environments. To meet these challenges, workers must rapidly master the operating procedures of these machines, referred to as machine tasks. Numerous tutoring systems have been developed to facilitate such training. These tutoring systems show potential to eventually eliminate live in-person one-on-one tutoring, which will greatly lower the training cost and increase the scalability of workforce training.

Recorded tutorials permit more efficient scaling than live in-person one-on-one tutoring. Prior studies have compared tutoring effects between live in-person tutoring and recorded tutorial-based training. Their results indicate that tutorial-based training is effective in efficient remote distribution and scalability. However, traditional live in-person one-on-one tutoring has significantly better training outcomes because, unlike a recorded tutorial which is mostly fixed and static once created, a live tutor can adapt to learners' uncertainty during the training and adjust the tutoring content to achieve better results. Accordingly, what is needed is a system for recorded tutorial-based training that enables this kind of adaptation to the learner's progress and uncertainty during the training.

SUMMARY

A method for providing tutorial guidance for performing a machine task is disclosed. The method comprises storing, in a memory, tutorial data defining a plurality of steps of a machine task, the plurality of steps including interactions with a machine in an environment. The method further comprises displaying, on a display, an augmented reality graphical user interface including graphical tutorial elements that convey information regarding the plurality of steps of the machine task, the graphical tutorial elements being superimposed on at least one of (i) the machine and (ii) the environment. The method further comprises monitoring, with at least one sensor, at least one of (i) motions of a first person and (ii) states of the machine during a performance of the machine task by the first person. The method further comprises evaluating, with a processor, the performance of the machine task by the first person based on the at least one of (i) the monitored motions of the first person and (ii) the monitored states of the machine. The method further comprises adapting, with the processor, a level of detail of the graphical tutorial elements in the augmented reality graphical user interface based on the evaluation of the performance of the machine task by the first person.

An augmented reality device for providing tutorial guidance for performing a machine task is disclosed. The augmented reality device comprises a memory configured to store tutorial data defining a plurality of steps of a machine task, the plurality of steps including interactions with a machine in an environment. The augmented reality device further comprises a display screen configured to display an augmented reality graphical user interface including graphical tutorial elements that convey information regarding the plurality of steps of the machine task, the graphical tutorial elements being superimposed on at least one of (i) the machine and (ii) the environment. The augmented reality device further comprises at least one sensor configured to measure sensor data. The augmented reality device further comprises a processor operably connected to the memory, the display screen, and the at least one sensor. The processor is configured to monitor, based on the sensor data, at least one of (i) motions of a first person and (ii) states of the machine during a performance of the machine task by the first person. The processor is further configured to evaluate the performance of the machine task by the first person based on the at least one of (i) the monitored motions of the first person and (ii) the monitored states of the machine. The processor is further configured to operate the display screen to adapting a level of detail of the graphical tutorial elements in the augmented reality graphical user interface based on the evaluation of the performance of the machine task by the first person.

BRIEF DESCRIPTION OF THE DRAWINGS

The foregoing aspects and other features of the machine task tutorial system are explained in the following description, taken in connection with the accompanying drawings.

FIG. 9 shows a table summarizing the types of graphical tutorial content displayed for five distinct levels of detail.

DETAILED DESCRIPTION

Figure 1A:
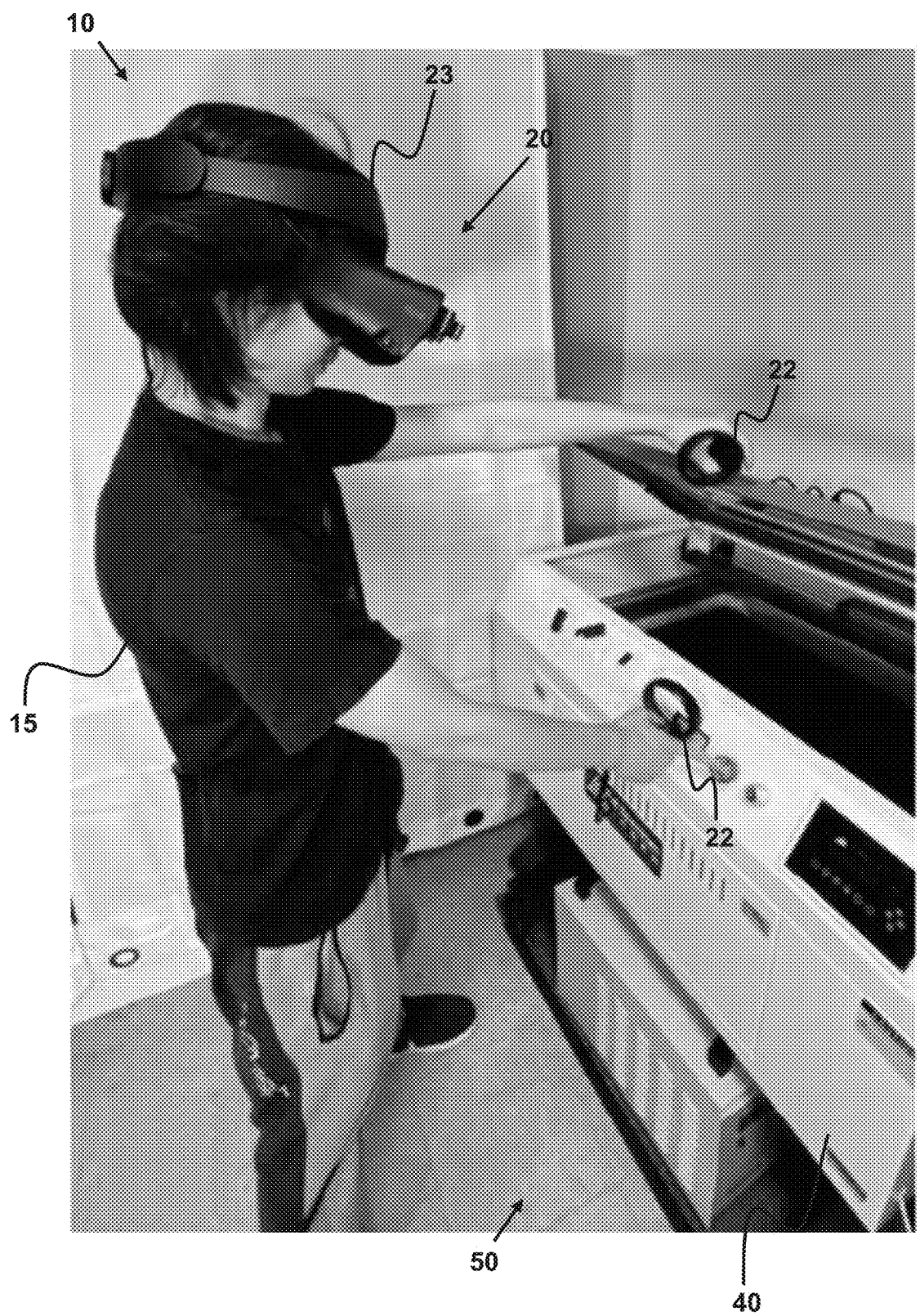
FIGS. 1A-1D show an exemplary embodiment of a machine task tutorial system and a workflow thereof.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

With reference to FIGS. 1A-1D, an exemplary embodiment of a machine task tutorial system 10 is described. The machine task tutorial system 10 is an augmented reality (AR)-based authoring and tutoring system that enables an expert user to record a tutorial for a machine task that can be learned by different trainee users in an adaptive manner. The machine task tutorial system 10 advantageously utilizes an adaptation model that focuses on spatial and bodily visual presence for machine task tutoring. The machine task tutorial system 10 advantageously enables adaptive tutoring in the recorded-tutorial environment based on machine state and user activity recognition. The machine task tutorial system 10 advantageously utilizes AR to provide tutorial recording, adaptive visualization, and state recognition. In this way, the machine task tutorial system 10 supports more effective apprenticeship and training for machine tasks in workshops or factories.

This concept of adaptation is particularly important in a machine task tutoring scenario, since trainee users are expected to be more versatile with various machine operations and processes, and machine task environments are highly dynamic and spatial. Furthermore, each trainee user has different innate capabilities, strengths, and weaknesses. By providing an adaptive learning environment, the machine task tutorial system 10 advantageously achieves better machine task skill transfer.

Additionally, the usage of AR enables better spatial and contextual content visualization. Particularly, a humanoid avatar is used as a virtual representation of the user, which enhances the trainee's bodily-expressive human-human communication. Moreover, AR naturally supports spatially and contextually aware instructions for interacting with the physical environment. Additionally, further graphical tutorial elements, such as annotations and animated components, are provided in AR to convey tutoring content and guide the trainee during training.

As used herein, a "machine task" refers to a sequence of physical and spatial operations involving a machine, for example in a production environment. In the illustrated embodiments, a machine task is performed by a user 15 with respect to a machine 40 in an environment 50. The machine 40 has one or more components that must be interacted with or manipulated by the user 15 to perform the machine task. The machine task tutorial system 10 is described herein primarily with a focus on the tutoring of machine tasks in which a production process involves a compound sequence of local, spatial, and body-coordinated human-machine interactions. However, machine task tutorial system 10 can be used for the tutoring of any machine task.

As shown in FIG. 1A, the machine task tutorial system 10 at least includes at least one AR system 20, at least part of which is worn or held by a user 15. The AR system 20 preferably includes a head mounted AR device 23 having at least a camera and a display screen (not shown), but may include any mobile AR device, such as, but not limited to, a smartphone, a tablet computer, a handheld camera, or the like having a display screen and a camera. In one example, the head mounted AR device 23 is in the form of an AR or virtual reality headset having an integrated or attached camera. In at least some embodiments, the AR system 20 further includes one or more hand-held controller(s) 22 having a user interface configured to enable interactions with the machine task tutorial system 10.

The AR system 20 is configured to track human body motion of the user 15 within the environment 50, in particular positions and movements of the head and hands of the user 15. To this end, the AR system 20 may further include external sensors (not shown) for tracking the track human body motion of the user 15 within the environment 50. Alternatively, the AR system 20 may instead comprise inside-out motion tracking sensors integrated with the head mounted AR device 23 and configured to track human body motion of the user 15 within the environment 50.

Figure 1B:
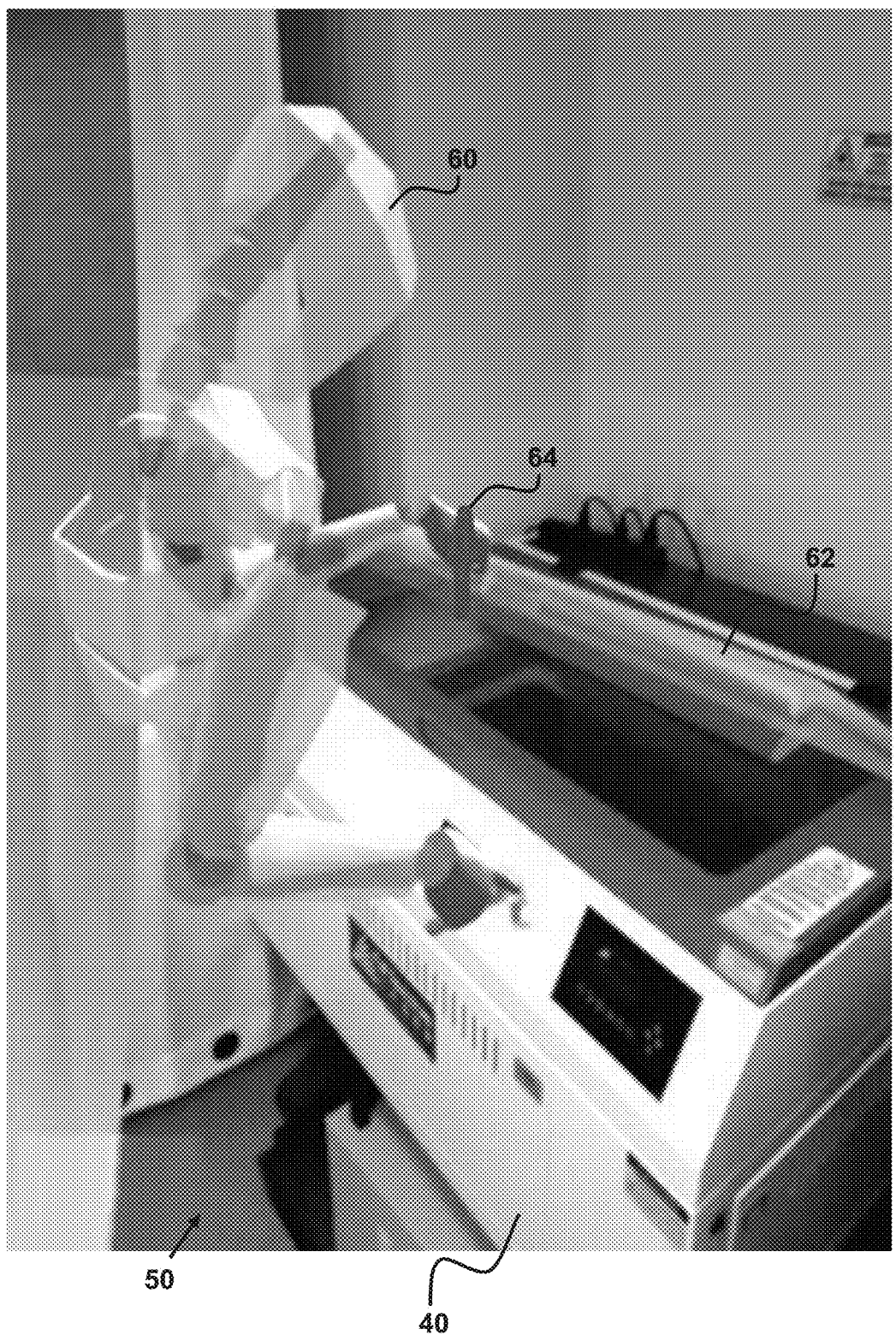
Figure 1C:
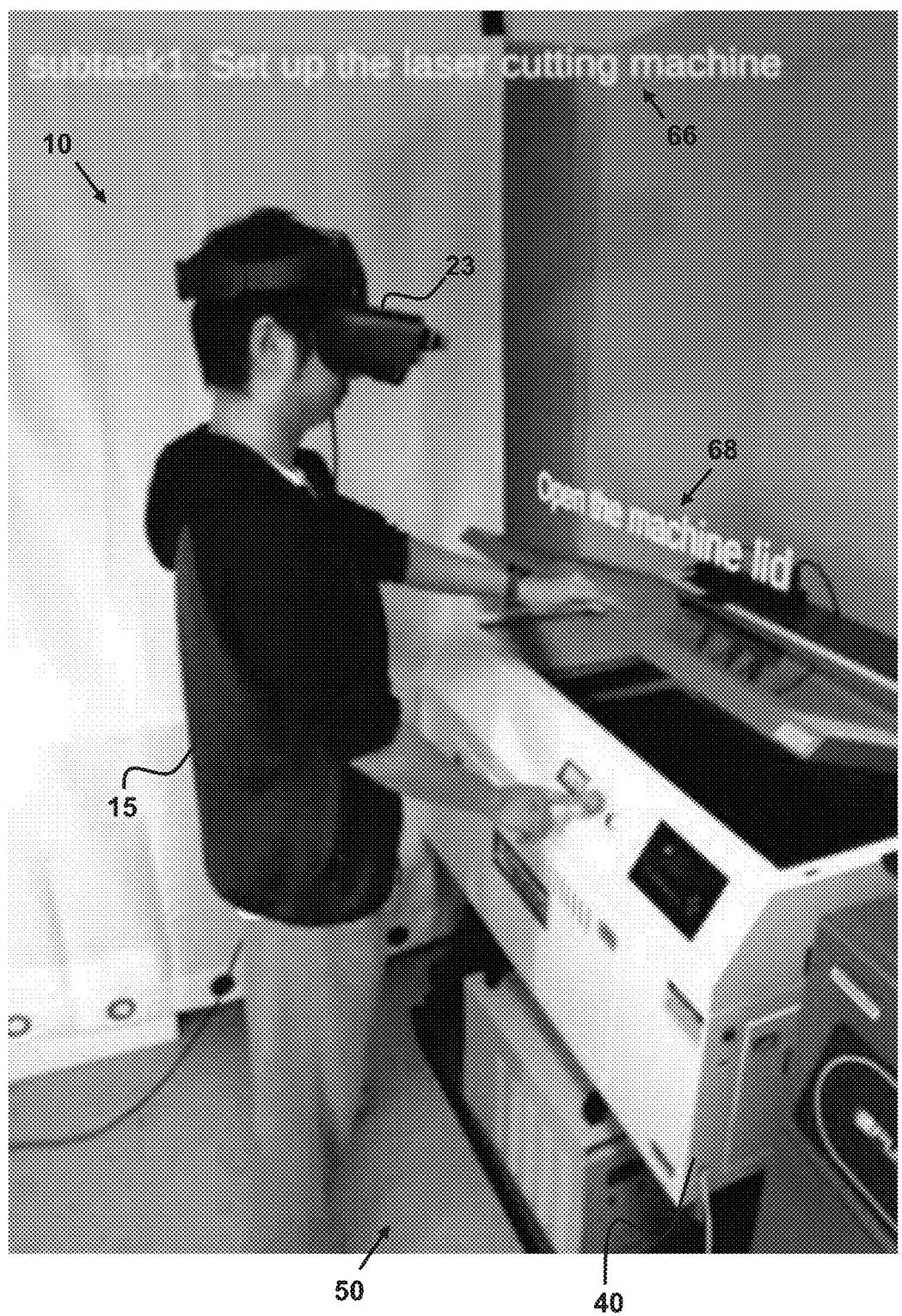
Figure 1D:
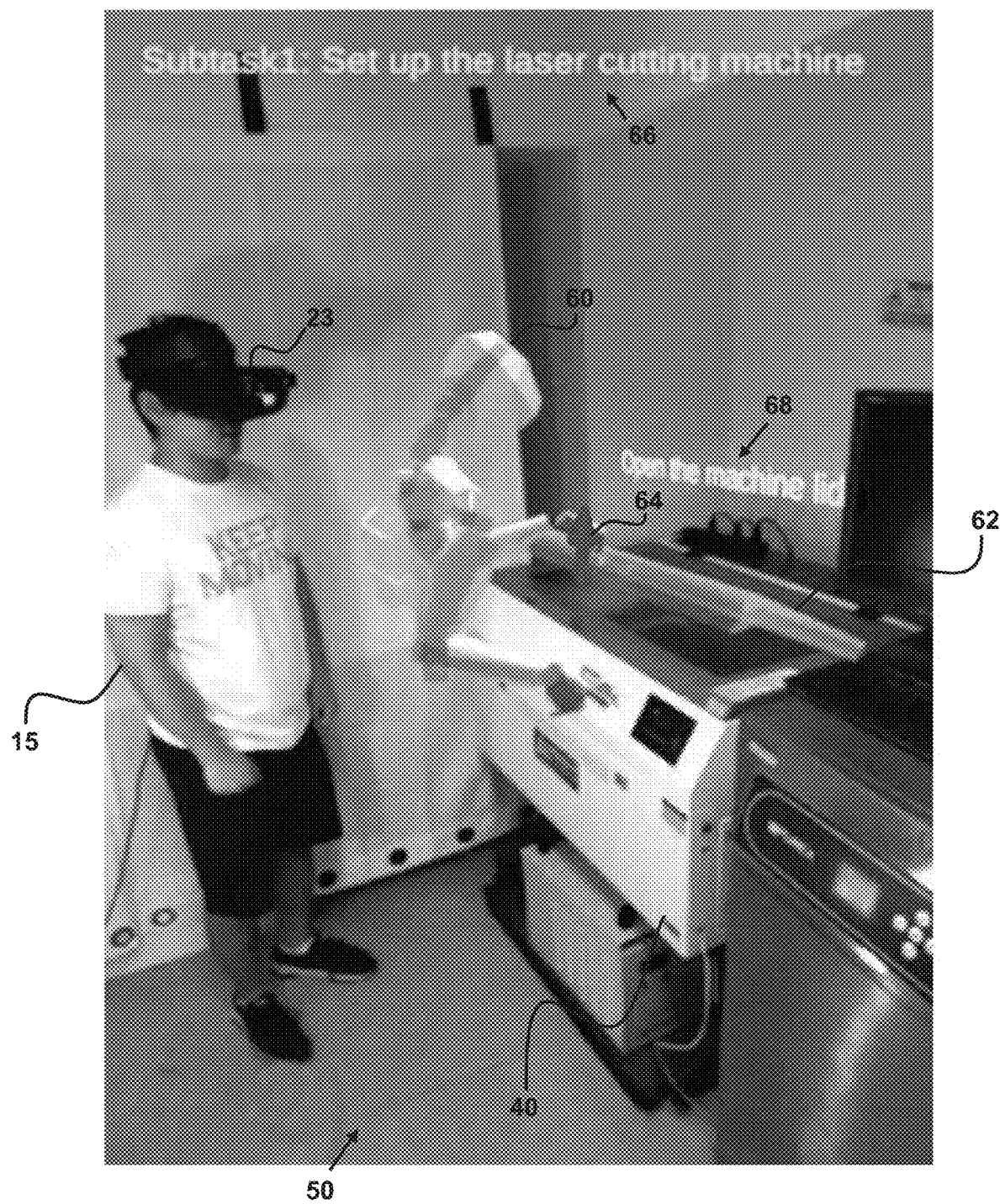

A workflow of the machine task tutorial system 10 is summarized by the illustrations of FIGS. 1A-1D. This workflow of the machine task tutorial system 10 is enabled by three distinct software operating modes: (1) an Authoring Mode in which an expert user can record a tutorial for a machine task, (2) an Edit Mode in which the expert user can edit the recorded tutorial, and (3) a Learning Mode in which trainee users can learn the machine task using the recorded tutorial. In the Authoring Mode, an expert user 15 records a tutorial using the AR system 20, as shown in FIG. 1A. In the Edit Mode, the recorded tutorial is represented in the environment with graphical tutorial elements including an AR avatar 60 and animated components 62 with guidance arrows 64, as shown in FIG. 1B. Additionally, in the Edit Mode, the expert user can edit the tutorial by adding further graphical tutorial elements including subtask descriptions 66 and step expectation descriptions 68, which are seen in FIGS. 1C-1D. Next, as shown in the illustrations of FIG. 1C-D, the recorded tutorial is adaptively displayed to a trainee user 15. As can been seen, the trainee user 15 in the illustration of FIG. 1C is given fewer graphical tutorial elements than the trainee user 15 in the illustration of FIG. 1D, due to differences in their experience and learning progress. In particular, in the illustration of FIG. 1C, the trainee user 15 is provided with graphical tutorial elements only including the subtask description 66 and the step expectation description 68. In contrast, in the illustration of FIG. 1D, the trainee user 15 is provided with graphical tutorial elements including all of the subtask description 66, the step expectation description 68, the AR avatar 60, the animated components 62, and the guidance arrows 64.

Exemplary Hardware and Software Components

Figure 2:
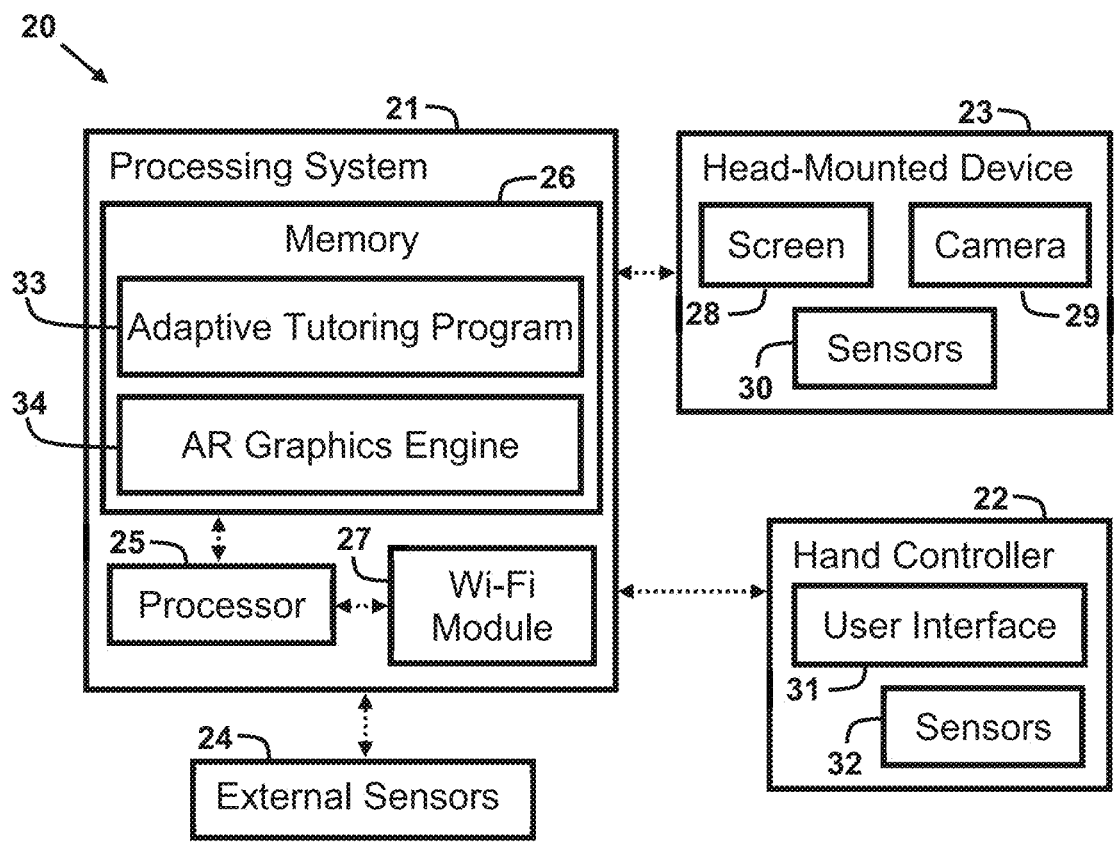
FIG. 2 shows exemplary components of an augmented reality system of the machine task tutorial system.

FIG. 2 shows exemplary components of the AR system 20 of the machine task tutorial system 10. It will be appreciated that the components of the AR system 20 shown and described are merely exemplary and that the AR system 20 may comprise any alternative configuration. Moreover, in the illustration of FIG. 2, only a single AR system 20 is shown. However, in practice the machine task tutorial system 10 may include one or multiple AR systems 20.

In the illustrated exemplary embodiment, the AR system 20 includes a processing system 21, the head mounted AR device 23 (e.g., Microsoft's HoloLens, Oculus Rift, or Oculus Quest), the at least one hand-held controller 22 (e.g., Oculus Touch Controllers), and external sensors 24 (e.g., Oculus IR-LED Sensors). In some embodiments, the processing system 21 may comprise a discrete computer that is configured to communicate with the at least one hand-held controller 22, and the head mounted AR device 23 via one or more wired or wireless connections. However, in alternative embodiments, the processing system 21 is integrated with the head mounted AR device 23. Additionally, in some embodiments, the external sensors 24 are omitted.

In the illustrated exemplary embodiment, the processing system 21 comprises a processor 25 and a memory 26. The memory 26 is configured to store data and program instructions that, when executed by the processor 25, enable the AR system 20 to perform various operations described herein. The memory 26 may be of any type of device capable of storing information accessible by the processor 25, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 25 may include a system with a central processing unit, graphics processing units, multiple processing units, dedicated circuitry for achieving functionality, programmable logic, or other processing systems.

The processing system 21 further comprises one or more transceivers, modems, or other communication devices configured to enable communications with various other devices, at least including head mounted AR device 23, the hand-held controllers 22, and the external sensors 24 (if applicable). Particularly, in the illustrated embodiment, the processing system 21 comprises a Wi-Fi module 27. The Wi-Fi module 27 is configured to enable communication with a Wi-Fi network and/or Wi-Fi router (not shown) and includes at least one transceiver with a corresponding antenna, as well as any processors, memories, oscillators, or other hardware conventionally included in a Wi-Fi module. It will be appreciated, however, that other communication technologies, such as Bluetooth, Z-Wave, Zigbee, or any other radio frequency-based communication technology or wired communication technology can be used to enable data communications between devices in the system 10.

The head mounted AR device 23 is in the form of an AR or virtual reality headset, generally comprising a display screen 28 and a camera 29 (e.g., ZED Dual 4 MP Camera (720p)). The camera 29 may be an integrated or attached camera and is configured to capture a plurality of images of the environment 50 as the head mounted AR device 23 is moved through the environment 50 by the user 15. The camera 29 is configured to generate image frames of the environment 50, each of which comprises a two-dimensional array of pixels. Each pixel has corresponding photometric information (intensity, color, and/or brightness). In some embodiments, the camera 29 is configured to generate RGB-D images in which each pixel has corresponding photometric information and geometric information (depth and/or distance). In such embodiments, the camera 29 may, for example, take the form of two RGB cameras configured to capture stereoscopic images, from which depth and/or distance information can be derived, or an RGB camera with an associated IR camera configured to provide depth and/or distance information.

The display screen 28 may comprise any of various known types of displays, such as LCD or OLED screens. In at least one embodiment, the display screen 28 is a transparent screen, through which a user can view the outside world, on which certain graphical elements are superimposed onto the user's view of the outside world. In the case of a non-transparent display screen 28, the graphical elements may be superimposed on real-time images/video captured by the camera 29. In further embodiments, the display screen 28 may comprise a touch screen configured to receive touch inputs from a user.

In some embodiments, the head mounted AR device 23 may further comprise a variety of sensors 30. In some embodiments, the sensors 30 include sensors configured to measure one or more accelerations and/or rotational rates of the head mounted AR device 23. In one embodiment, the sensors 30 comprises one or more accelerometers configured to measure linear accelerations of the head mounted AR device 23 along one or more axes (e.g., roll, pitch, and yaw axes) and/or one or more gyroscopes configured to measure rotational rates of the head mounted AR device 23 along one or more axes (e.g., roll, pitch, and yaw axes). In some embodiments, the sensors 30 may include inside-out motion tracking sensors configured to track human body motion of the user 15 within the environment 50, in particular positions and movements of the head and hands of the user 15.

The head mounted AR device 23 may also include a battery or other power source (not shown) configured to power the various components within the head mounted AR device 23, which may include the processing system 21, as mentioned above. In one embodiment, the battery of the head mounted AR device 23 is a rechargeable battery configured to be charged when the head mounted AR device 23 is connected to a battery charger configured for use with the head mounted AR device 23.

In the illustrated exemplary embodiment, the hand-held controller(s) 22 comprise a user interface 31 and sensors 32. The user interface 31 comprises, for example, one or more buttons, joysticks, triggers, or the like configured to enable the user 15 to interact with the machine task tutorial system 10 by providing inputs. In one embodiment, the sensors 30 may comprise one or more accelerometers configured to measure linear accelerations of the hand-held controller 22 along one or more axes and/or one or more gyroscopes configured to measure rotational rates of the hand-held controller 22 along one or more axes. The hand-held controller(s) 22 further include one or more transceivers (not shown) configured to communicate inputs from the user 15 to the processing system 21. In some embodiments, rather than being grasped by the user, the hand-held controller(s) 22 are in the form of a glove, which is worn by the user and the user interface includes sensors for detecting gesture-based inputs or the like.

The program instructions stored on the memory 26 include an AR adaptive tutoring program 33. As discussed in further detail below, the processor 25 is configured to execute the AR adaptive tutoring program 33 to enable the authoring and provision of tutorials for machine tasks with respect to the machine 40. In one embodiment, the program instructions stored on the memory 26 further include an AR graphics engine 34 (e.g., Unity3D engine), which is used to render the intuitive visual interface for the AR adaptive tutoring program 33. Particularly, the processor 25 is configured to utilize the AR graphics engine 34 to superimpose on the display screen 28 graphical elements for the purpose of authoring tutorials for machine tasks, as well as guiding a learner with graphical tutorial elements during provision of the tutorials for the machine tasks. In the case of a non-transparent display screen 28, the graphical elements may be superimposed on real-time images/video captured by the camera 29.

Figure 3:
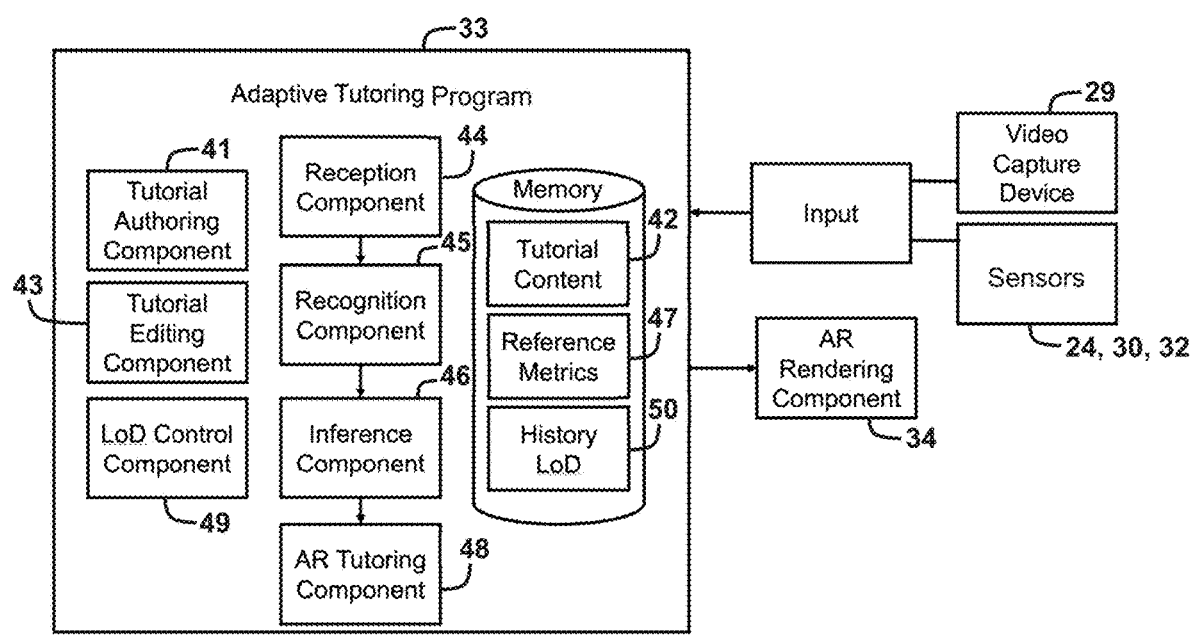
FIG. 3 shows a functional block diagram of an adaptive tutoring program of the augmented reality system.

FIG. 3 shows a functional block diagram of the AR adaptive tutoring program 33. The AR adaptive tutoring program 33 receives as inputs data from the sensors 24, 30, 32 and video from the video capture device (e.g., the camera 29). The AR adaptive tutoring program 33 includes a tutorial authoring component 41 that enables the user to author tutorial content 42 in the Authoring Mode, which is stored in memory. The AR adaptive tutoring program 33 includes a tutorial editing component 43 that enables the user to edit the tutorial content 42 in the Edit Mode. The AR adaptive tutoring program 33 includes a reception component 44, a recognition component 45, and inference component 46 that work together process the sensor and video data to recognize the states of the user's hands and of the machine 40, and make inferences about the interactions or processes that are being performed, using various reference metrics 47 stored in the memory. The AR adaptive tutoring program 33 includes an AR tutoring component 48 that enables tutoring of the user in the Learning Mode. Finally, the AR adaptive tutoring program 33 includes a level of detail (LoD) control component 49 that adjusts the level of detail of graphical tutorial elements in real-time during the Learning Mode in an adaptive manner, in part based on historical LoD information 50 stored in the memory.

In one embodiment, some predictions/calculations are made with a backend server, for example running aiohttp web framework in Python. The backend server loads the models trained by Tensorflow (v2.1) and SVM. Both the AR graphics engine 34 and the backend server may run on the same processing system 21. The head mounted AR device 23 provides built-in streaming functionality that can be accessed by the backend server. The AR graphics engine 34 sends data to the backend server via Socket.IO, including the objects to be tracked, their bounding boxes, and the positional data of the head mounted AR device 23. In return, the backend server sends the predicted machine state and user state back to AR graphics engine 34 via Socket.IO.

Methods for Operating the Machine Task Tutorial System and AR System Thereof

A variety of methods, workflows, and processes are described below for enabling the operations and interactions of the Authoring Mode, Edit Mode, and Learning Mode of the AR system 20. In these descriptions, statements that a method, workflow, processor, and/or system is performing some task or function refers to a controller or processor (e.g., the processor 25) executing programmed instructions (e.g., the AR adaptive tutoring program 33, the AR graphics engine 34, and/or the a machine component recognition module 35) stored in non-transitory computer readable storage media (e.g., the memory 26) operatively connected to the controller or processor to manipulate data or to operate one or more components in the machine task tutorial system 10 to perform the task or function. Additionally, the steps of the methods may be performed in any feasible chronological order, regardless of the order shown in the figures or the order in which the steps are described.

Additionally, various AR graphical user interfaces are utilized for operating the AR adaptive tutoring program 33 in the Authoring Mode, Edit Mode, and Learning Mode of the AR system 20. In many cases, the AR graphical user interfaces include graphical elements that are superimposed onto the user's view of the outside world or, in the case of a non-transparent display screen 28, superimposed on real-time images/video captured by the camera 29. In order to provide these AR graphical user interfaces, the processor 25 executes instructions of the AR graphics engine 34 to render these graphical elements and operates the display 28 to superimpose the graphical elements onto the user's view of the outside world or onto the real-time images/video of the outside world. In many cases, the graphical elements are rendered at a position that depends upon positional or orientation information received from any suitable combination of the external sensor 24, the sensors 30, the sensor 32, and the camera 29, so as to simulate the presence of the graphical elements in real-world the environment 50. However, it will be appreciated by those of ordinary skill in the art that, in many cases, an equivalent non-AR graphical user interface can also be used to operate the AR adaptive tutoring program 33, such as a user interface provided on a further computing device such as laptop computer, tablet computer, desktop computer, or a smartphone.

Moreover, various user interactions with the AR graphical user interfaces and with interactive graphical elements thereof are utilized. In order to provide these user interactions, the processor 25 may render interactive graphical elements in the AR graphical user interface, receive user inputs from, for example, the user interface 31 of the hand-controller 22 or via gestures performed in view of the camera 29 or other sensor, and execute instructions of the AR adaptive tutoring program 33 to perform some operation in response to the user inputs.

Finally, various forms of motion tracking are utilized in which spatial positions and motions of the user 15, or of other objects in the environment 50 are tracked. In order to provide this tracking of spatial positions and motions, the processor 25 executes instructions of the AR adaptive tutoring program 33 to receive and process sensor data from any suitable combination of the external sensor 24, the sensors 30, the sensor 32, and the camera 29, and may optionally utilize visual and/or visual-inertial odometry methods such as simultaneous localization and mapping (SLAM) techniques.

Method for Providing Adaptive Tutorial Guidance for Performing a Machine Task

Figure 4:
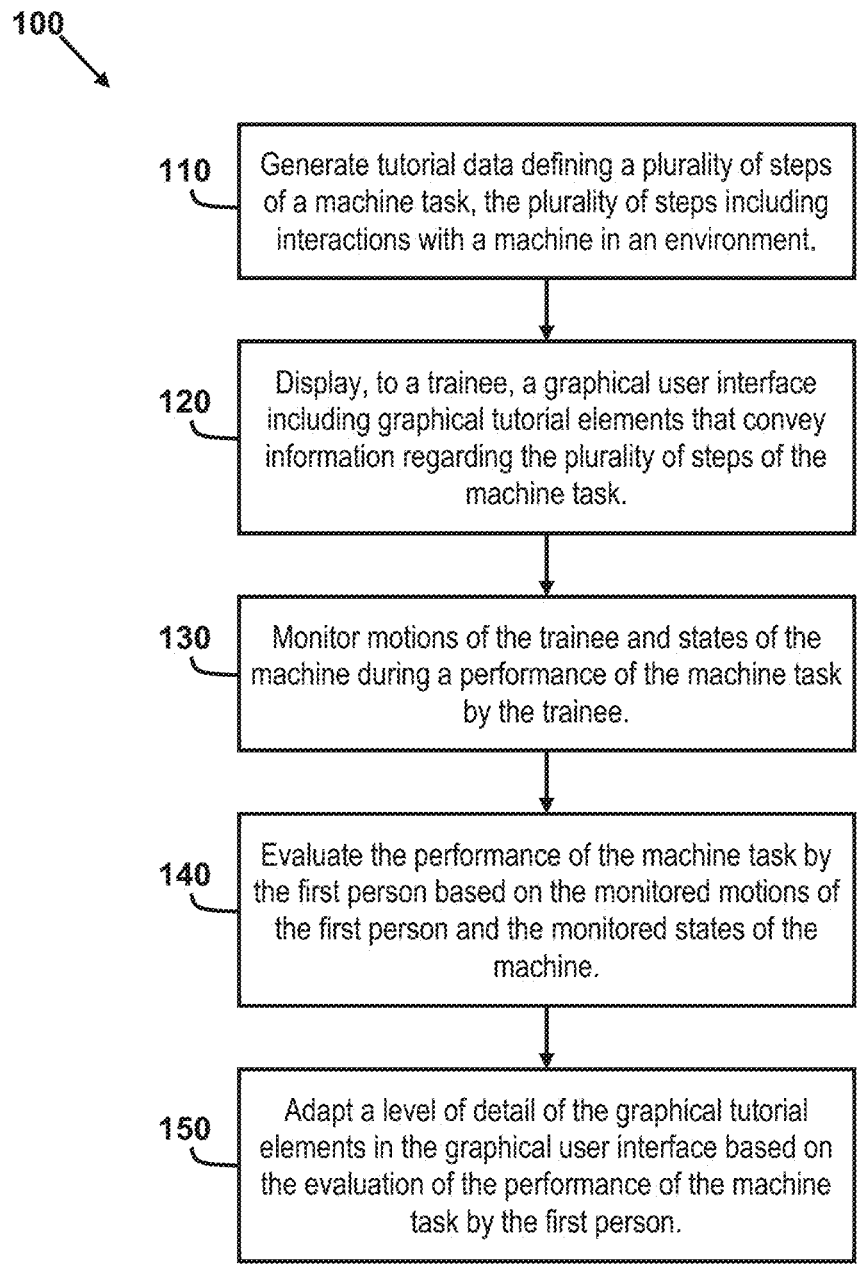
FIG. 4 shows a method for providing tutorial guidance for performing a machine task.

FIG. 4 shows a method 100 for providing tutorial guidance for performing a machine task. The method 100 advantageously utilizes an adaptation model that focuses on spatial and bodily visual presence for machine task tutoring. The method 100 enables adaptive tutoring in the recorded-tutorial environment based on machine state and user activity recognition. The method 100 advantageously utilizes AR to provide tutorial recording, adaptive visualization, and state recognition. In this way, the method 100 supports more effective apprenticeship and training for machine tasks in workshops or factories.

The method 100 begins with generating tutorial data defining a plurality of steps of a machine task, the plurality of steps including interactions with a machine in an environment (block 110). Particularly, an expert user 15 operates the AR system 20 to record a tutorial for operating a particular machine 40 in an environment 50. The recorded tutorial is stored in the memory 26 as tutorial data. The tutorial data defines the plurality steps of the machine task that is the subject matter of the recorded tutorial. Some or all of the steps of the machine task include interactions between the user and the machine 40.

Before an expert user can record a tutorial for a machine 40, the training environment 50 must be initialized. In at least one embodiment, this initialization includes operating the AR system 20 to virtually place a digital model of the machine 40 in the environment 50 in alignment with its physical counterpart, including digital models of the interactive physical components of the machine 40. In one example, the expert user 15 performs this initialization by using the hand-held controllers 22 to align virtual AR components with their physical counterparts in the training environment 50. Additionally, as discussed in further detail below, the initialization may include training one or more component state detection models to recognize the states of components of the machine 40 and training one or more component interaction detection models to recognize interactions with the components of the machine 40. In one example, the expert user 15 collects a dataset for training by capturing video of the components with each possible state and during interaction therewith. Once enough data is collected, the models are trained using with the captured video dataset. Generally, this dataset only needs to be collected once for each type of machine 40.

In order to record a tutorial, the expert user 15 first operates the AR system 20 in the Authoring Mode. In the Authoring Mode, tutorials are authored using natural embodied movements (also referred to as "bodily demonstration"). Particularly, as the expert user 15 role-plays the human actions and machine component interactions required to perform the machine task, the AR system 20 records a time sequence of the expert user's body motions and/or body poses by tracking the position and orientation of the head mounted AR device 23, for example using SLAM techniques, and tracking the position and orientation of two hand-held controllers 22 (FIG. 1A). In addition, as the expert user 15 physically interacts with components of the machine 40 and/or manipulates the equivalent virtual representations of the components of the machine 40 through different gestures using the hand-held controller(s) 22, the AR system 20 records a time sequence of interactions, poses (six degrees of freedom), and/or states of the physical components and/or the virtual components of the machine 40.

Once the human motions and machine interactions for each step in the machine task are recorded for the tutorial, one or more AR graphical user interfaces are displayed to the expert user 15 on the display screen 28 in the Authoring Mode and in the Editing Mode. In the displayed AR graphical user interface, the AR system 20 automatically represents the recorded human motion (i.e., the bodily demonstrations) as AR avatars (e.g., the AR avatar 60 of FIG. 1B). Additionally, the AR system 20 automatically represents the recorded poses and/or state sequences of the physical components and/or the virtual components of the machine 40 as animated components with guidance arrows (e.g., the animated component 62 with guidance arrow 64 of FIG. 1B). In at least one embodiment, the expert user 15 defines each step in the machine task explicitly starting and stopping the recording for each step by pressing a joystick or similar of the hand-held controller(s) 22.

Figure 5:
FIG. 5 shows an exemplary graphical user interface of the adaptive tutoring program for editing a recorded tutorial.

Next, the expert user 15 operates the AR system 20 in the Editing Mode to edit and refine the recorded tutorial. In the Editing Mode, the expert user 15 can add further graphical tutorial elements including subtask descriptions and step expectation descriptions. FIG. 5 shows an exemplary AR graphical user interface 200 in the Edit Mode. The interface 200 includes a row of icons 202 corresponding to the plurality of steps of the machine task, which were defined previously in the Authoring Mode. To add a subtask description using the interface 200, the expert user 15 operates the AR system 20 to (i) define a subtask by selecting a group of consecutive steps by interacting with the icons 202 and (ii) type text via a virtual keyboard 204 to define the subtask description (e.g., "Set up the laser cutting machine."). To add a step expectation description using the interface 200, the expert user 15 operates the AR system 20 to (i) select an individual step by interacting with the icons 202, (ii) type text via the virtual keyboard 204 to define the step expectation description, and (iii) to anchor the step expectation description at the appropriate position in the environment 50 by moving/pointing the hand-held controller(s) 22.

Returning to FIG. 4, the method 100 continues with displaying, to a trainee, a graphical user interface including graphical tutorial elements that convey information regarding the plurality of steps of the machine task (block 120). Particularly, the processor 25 operates the display screen 28 to display an AR graphical user interface including graphical tutorial elements that convey information regarding the plurality of steps of the machine task. Once the tutorial data of the recorded tutorial is generated by the expert user, a trainee user 15 can utilize the AR system 20 to provide a tutorial for performing the machine task with respect to the machine 40. If the tutorial data is not already stored in the memory 26 of the AR system 20, the trainee user 15 can operate the AR system 20 to download the tutorial data from another device and/or from a central repository or server backend.

In the Learning Mode, the AR system 20 utilizes the stored tutorial data to display an AR graphical user interface to the trainee user 15 having a plurality of graphical tutorial elements that convey information regarding the plurality of steps of the machine task that is being tutored. In at least some embodiments, the trainee user 15 wears the head mounted AR device 23, without the hand-held controller(s) 22 (as shown in FIG. 1C-1D) and views the AR graphical user interface overlaid upon the surrounding environment 50.

As used herein, the term "graphical tutorial elements" refers to any virtual or digital elements that graphically provide information or tutorial guidance regarding a task. The graphical tutorial elements may include any visual and/or graphical content, for example, text data, two-dimensional images, three-dimensional models, animations, virtual arrows or similar virtual indicators, or any other graphical content. In at least some embodiments, these graphical tutorial elements are superimposed on the environment using AR.

As a trainee user 15 performs each step of the machine task, the AR system 20 displays graphical tutorial elements in the AR graphical user interface to convey sequential and logical knowledge to the trainee user 15 of the plurality of steps of the machine task. Such knowledge may include, for example, human motions to perform in the environment 50 for each step, a target component (e.g., knob, lever) of the machine 40 that is to be manipulated for each step, a target state that the target component of the machine 40 is to be set to for each step, an order to perform operations in each step, and the expected outcome for each step. In some embodiments, the AR system 20 is configured to display several different categories or types of graphical tutorial elements. Each particular category or type of graphical tutorial elements can be selectively shown or hidden in the AR graphical user interface to convey tutorial information regarding the plurality of steps of the machine task with varying amounts of detail.

Figure 6A:
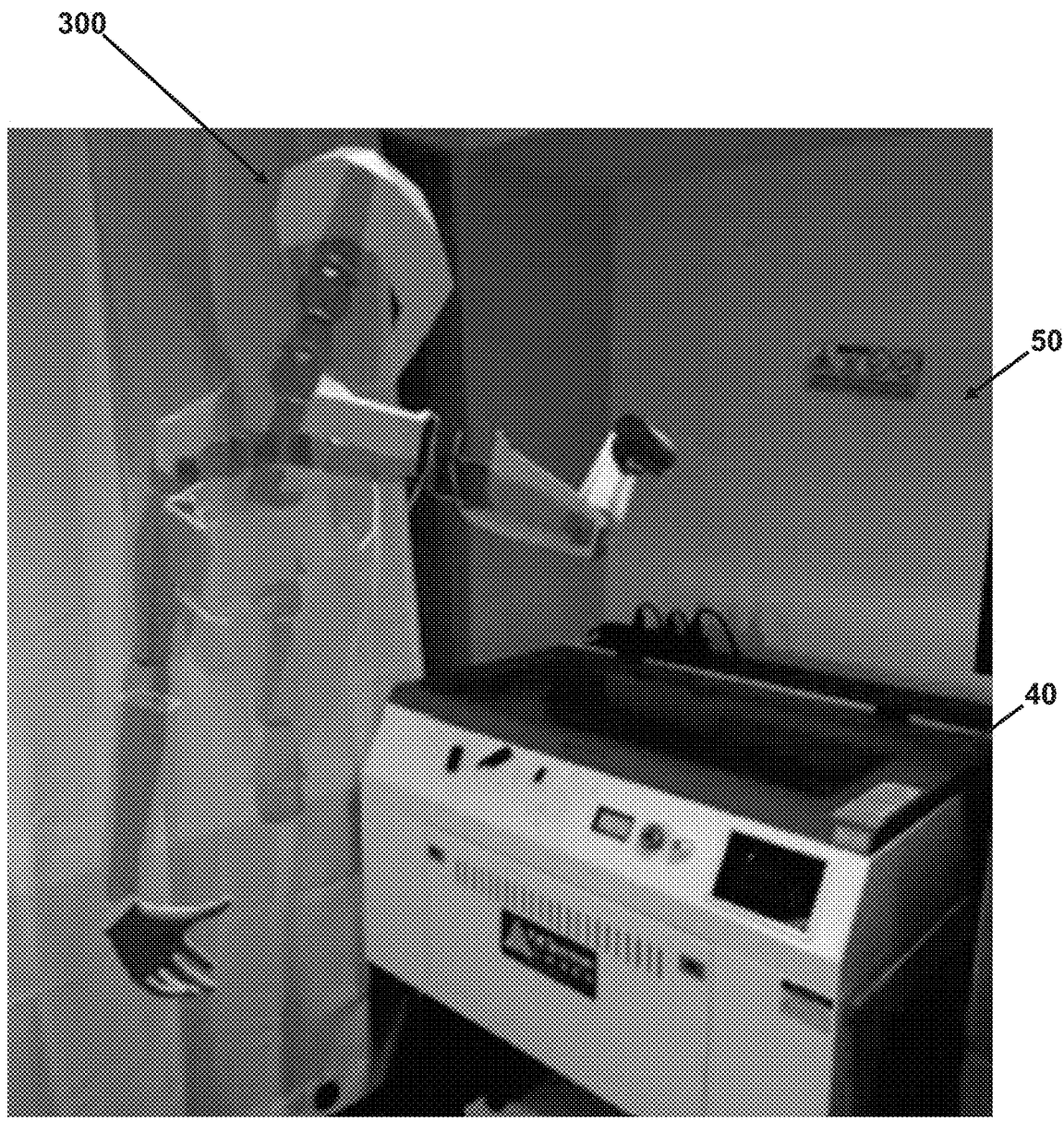
FIGS. 6A-6D show four exemplary types of graphical tutorial elements displayed to provide the tutorial guidance for performing the machine task.

As a first type of graphical tutorial element, the AR graphical user interface of the AR system 20 may include AR avatars that illustrate the human motions required to perform the particular step of the machine task. Specifically, the AR avatars are virtual representations of a human that are animated to demonstrate the location of an interaction, a navigation path, and a body motion required to accomplish a step of the machine task. Since machine tasks often involve spatial and body-coordinated human-machine interactions, the presence of AR avatar provides benefits in machine task tutoring by improving learners' spatial attention and understanding of potential movement. FIG. 6A shows an exemplary AR avatar 300 that shows a step of a machine task in which the user opens a lid of a machine 40 during a set up process of the machine 40.

Figure 6B:
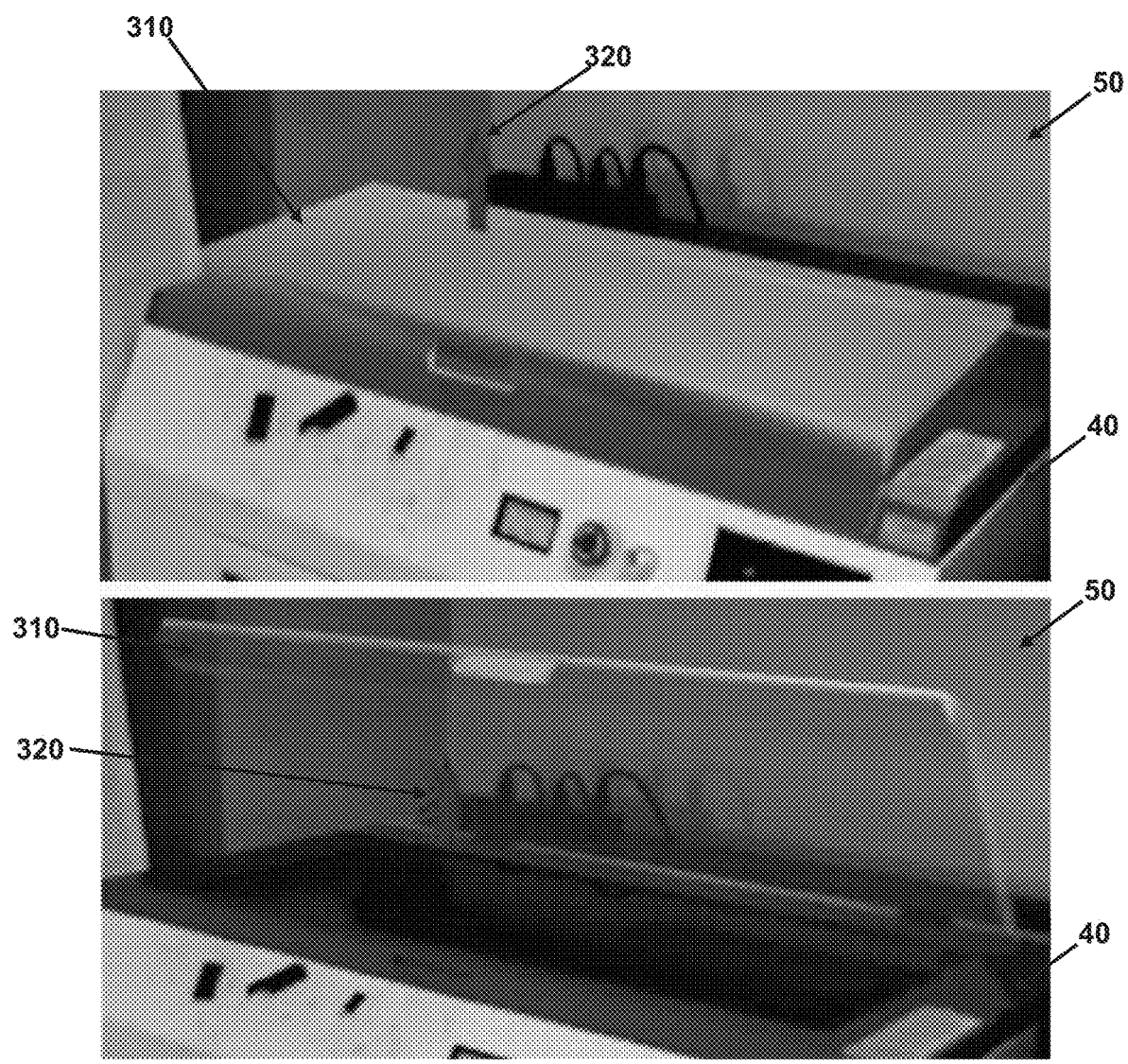

As a second type of graphical tutorial element, the AR graphical user interface of the AR system 20 may include animated components and guidance arrows. Specifically, the animated components are virtual representations of machine components (e.g., a knob, lid, etc.) that are animated to demonstrate show the required interaction or manipulation for the respective step of the machine task. The animation is looped to repeatedly demonstrate the required manipulation of the machine component. However, when the animation looped, users may feel confused about the actual direction of some types of animations (e.g., clockwise or counter-clockwise). To this end, the AR graphical user interface of the AR system 20 further includes a guidance arrow that indicates a direction of the required interaction or manipulation for the respective step of the machine task. In this way, the trainee user 15 better understands the required interaction or manipulation for the respective step of the machine task. FIG. 6B shows an exemplary animated component 310 that shows a step of a machine task in which the user opens a lid of a machine 40 during a set up process of the machine. The animated component 310 is animated to demonstrate the opening motion of the lid of the machine 40. Additionally, a guidance arrow 320 is provided to indicate the upward direction of lid opening process.

Figure 6C:
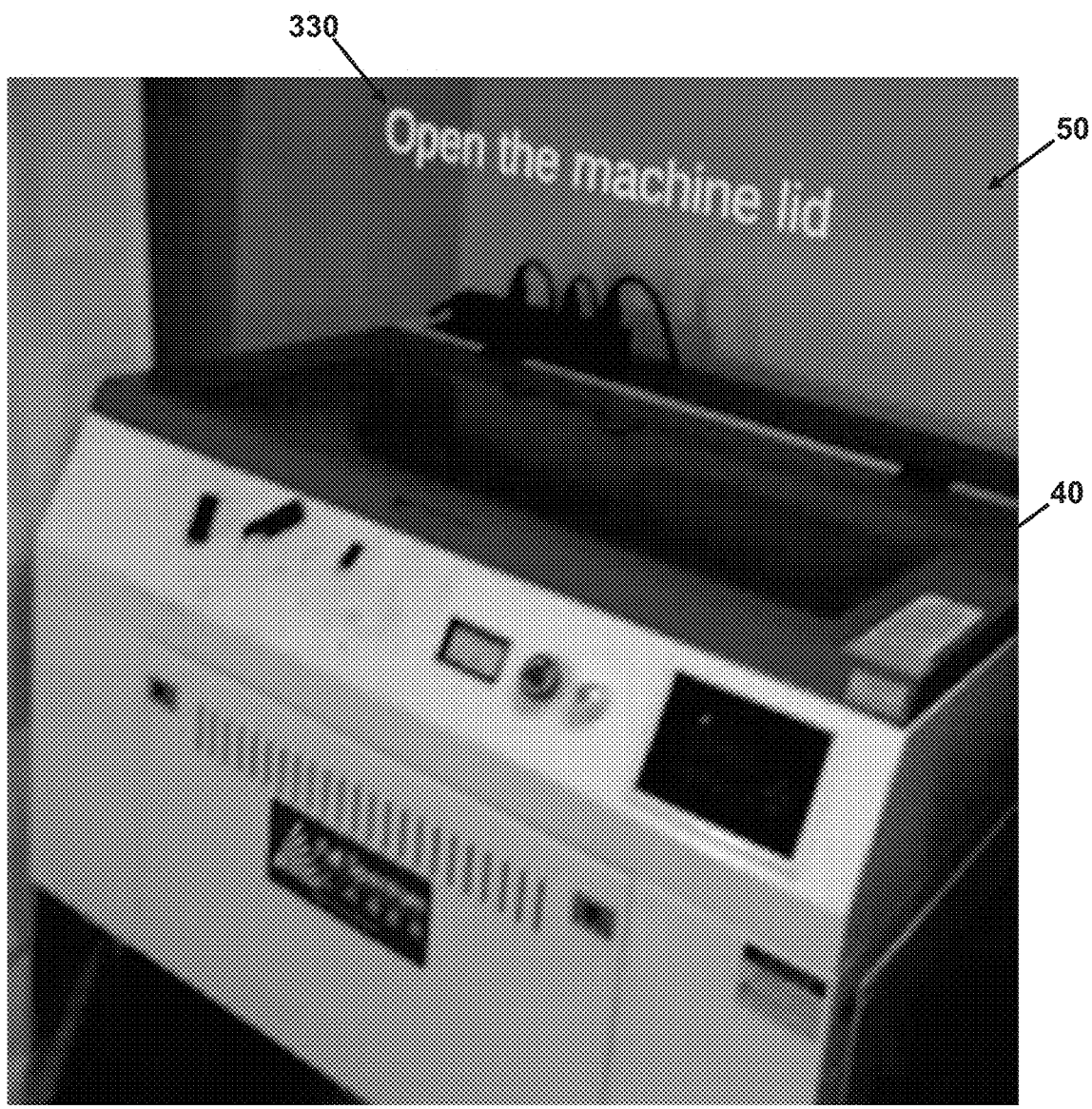

As a third type of graphical tutorial element, the AR graphical user interface of the AR system 20 may include step expectation descriptions. A step expectation description is a text description or other graphical representation that describes the expectations or end goal of a respective step of the machine task. Particularly, when it comes to steps that require a user to set a component of the machine 40 to a specific state or with a specific parameter, it is often inadequate to convey the expected value by purely using animated components and guidance arrows. To complement these, the AR system 20 shows the step expectation descriptions (e.g., floating colored text) right next to the animated component to indicate the expected value (e.g., "Set the printer head temperature to 500 F") or to indicate the expected outcome (e.g., "Turn on the laser cutter") of the step. It should be appreciated that the step expectation descriptions may utilize formats other than descriptive text. For some steps, the step expectation description may take the form of a virtual 3D model or image of the expected value or outcome, such as a virtual model that is to be 3D printed or an image of a tool to be used. FIG. 6C shows an exemplary step expectation description 330 including text (e.g., "Open the machine lid") describing the expected outcome of the step.

Figure 6D:
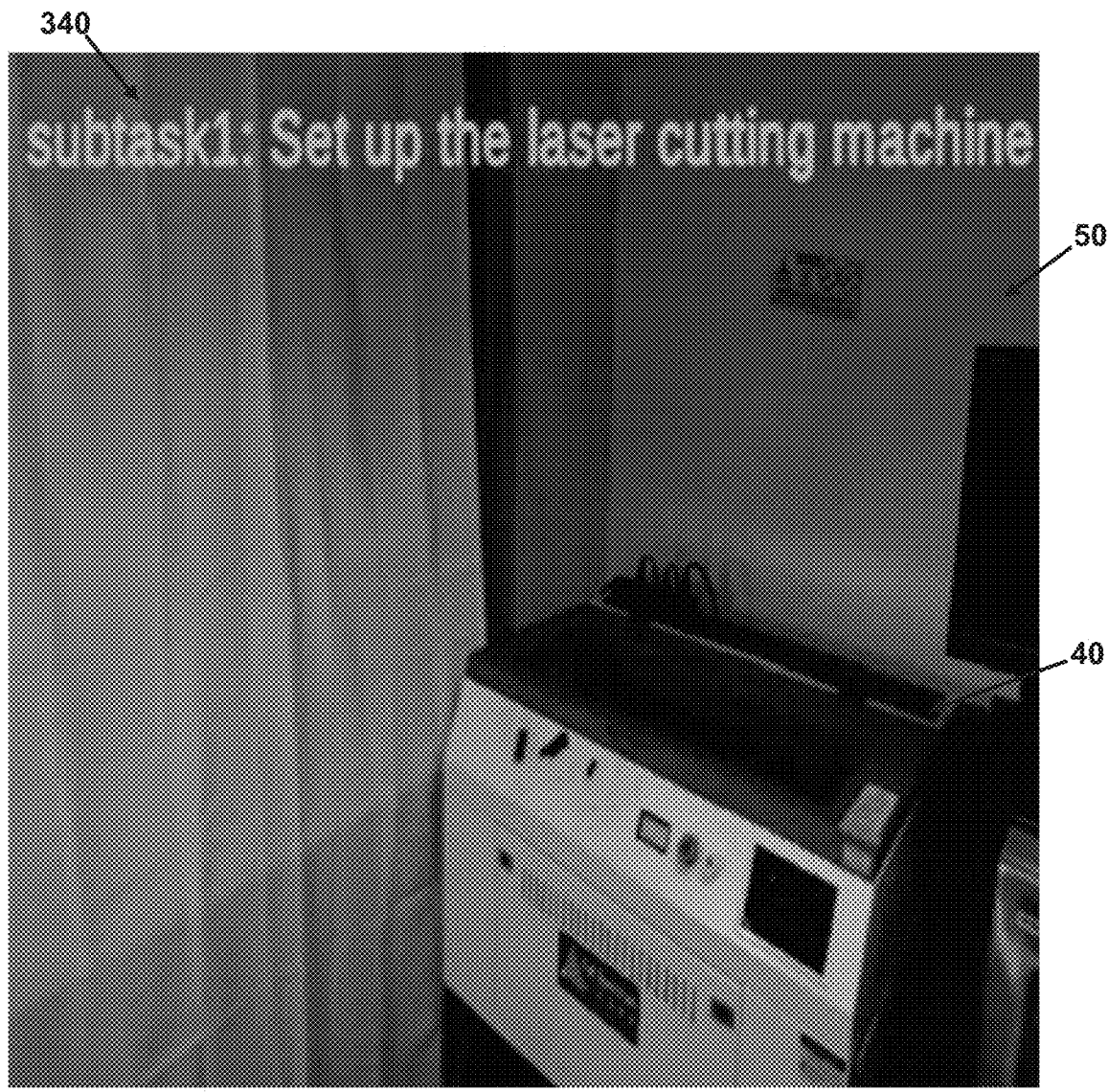

As a fourth type of graphical tutorial element, the AR graphical user interface of the AR system 20 may include subtask descriptions. A subtask description is a text description or other graphical representation that describes the expectations or end goal of a respective group of consecutive steps of the machine task. Particularly, as noted above, a machine task consists of a plurality of steps. Certain groups of consecutive steps may represent a cohesive sub-goal, which is referred to herein as a subtask. For example, a subtask "Replace the 3D printer head" might involve the consecutive steps of: (1) loosening a safety lock, (2) removing an existing printer head, (3) picking up a new printer head, (4) installing the new printer head, and (5) tightening the safety lock. In one embodiment, a subtask description is shown at the top-left corner of a user's view in the AR graphical user interface to help the user build a higher-level understanding of the machine task. Much like the step expectation descriptions, the subtask descriptions may include descriptive text or other data formats (e.g., a 3D model or an image), which represent the cohesive sub-goal of the machine task. FIG. 6D shows an exemplary subtask description 340 including text (e.g., "Subtask1: Set up the laser cutting machine") describing the current sub-goal or subtask of the machine task.

As discussed in greater detail below, the number of and/or the types of graphical tutorial elements displayed to the trainee user 15 via the AR graphical user interface is adapted over time depending on an evaluation of the trainee user's performance during the machine task. Particularly, the AR system 20 is configured to dynamically adapt the graphical tutorial elements to match what the trainee user 15 actually needs. In at least one embodiment, a trainee user 15 starts with a high level of detail so that they are given all of the graphical tutorial elements to guide them in operating the machine 40. As a trainee user 15 may need to repeat the tutorial for multiple trials before comprehending it, the AR system 20 adapts the number of and/or the types of the graphical tutorial elements that are displayed for each step based on their historical learning progress and the current behavior, generally reducing the number of graphical tutorial elements as the trainee user 15 becomes more experienced, and adding graphical tutorial elements back as needed if the trainee user 15 experiences difficulty.

Returning to FIG. 4, the method 100 continues with monitoring motions of the trainee and states of the machine during a performance of the machine task by the trainee (block 130). Particularly, based on sensor data received from one or more of the sensors 24, 29, 30, 32, the processor 25 monitors motions of the trainee user and states of the machine during a performance of the machine task by the first person. More particularly, the processor 25 is configured to continuously monitor three 'low-level' states (1) a state of each component of the machine 40, (2) a state of the trainee user 15, and (3) a state indicating whether the trainee user 15 is looking at a region of interest for the current step of the machine task. The AR system 20 utilizes these low-level states in order to control the progression or playback of the recorded tutorial as the trainee user 15 performs the machine task.

In order to monitor these low-level states, the processor 25 receives sensor data from one or more of the sensors 24, 29, 30, 32. Particularly, the processor 25 receives position, acceleration, and/or orientation data from the sensors 30 of the head mounted AR device 23 and video and/or image data from the camera 29 of the head mounted AR device 23. Additionally, in some embodiments, the processor 25 may receive further sensor data from the external sensors 24 and/or from the sensors 32 of the hand-held controller(s) 22 (if used by the trainee user). Based on these sensor data, the processor 25 tracks a position and orientation of the trainee user 15 within the environment 50, for example using SLAM techniques. Additionally, based on these sensor data, the processor 25 tracks positions, orientations, and/or states of each component of the machine 40.

As noted above, the low-level states that are monitored by the AR system 20 may include (1) a state of each component of the machine 40. As used herein, the "state" of a component of the machine 40 refers to a position, orientation, setting, adjustment, or status of any physical or digital component of the machine 40. In at least some embodiments, the processor 25 determines the state of each component of the machine 40 by detecting a position of each component of the machine 40 and determining a state of each component of the machine with reference to the detected position. Notably, some components of the machine 40 may be identical to other components of the machine 40, such as a machine 40 having multiple unique but otherwise similar knobs, buttons, or switches. Accordingly, the positions of each component are continuously tracked to distinguish between multiple unique but otherwise similar components. These tracked positions are advantageously utilized both for displaying the animated components (e.g., the animated component 310 of FIG. 6B) in the AR graphical user interface and for monitoring the states of the physical components.

In some embodiments, the processor 25 determines 2D bounding boxes in the video and/or image data received from the camera 29 based on the tracked positions of the physical components of the machine 40. Each 2D bounding box is determined so as to encompass a respective physical component of the machine 40 that is currently in view of the camera 29. In one embodiment, the 2D bounding box is determined based on a 3D bounding box that is located at the tracked position of physical component. The size of the 3D bounding box may be determined according to the virtual component model corresponding to the physical component, which was placed during the initialization phase.

In some embodiments, the processor 25 determines the state of a respective component using a component state detection model based on video and/or image data cropped by the 2D bounding box for the respective component. Particularly, the processor 25 crops the video and/or image data received from the camera 29 using the determined 2D bounding box and provides the cropped video and/or images as an input to a respective component state detection model that has been trained to recognize the state of the respective component that is captured in the cropped video and/or images.

The component state detection model(s) may comprise machine learning models. As used herein, the term "machine learning model" refers to a system or set of program instructions and/or data configured to implement an algorithm, process, or mathematical model (e.g., a neural network) that predicts or otherwise provides a desired output based on a given input. It will be appreciated that, in general, many or most parameters of a machine learning model are not explicitly programmed and the machine learning model is not, in the traditional sense, explicitly designed to follow particular rules in order to provide the desired output for a given input. Instead, a machine learning model is provided with a corpus of training data from which it identifies or "learns" patterns and statistical relationships in the data, which are generalized to make predictions or otherwise provide outputs with respect to new data inputs. The result of the training process is embodied in a plurality of learned parameters, kernel weights, and/or filter values that are used in the various components of the machine learning model to perform various operations or functions.

Figure 7:
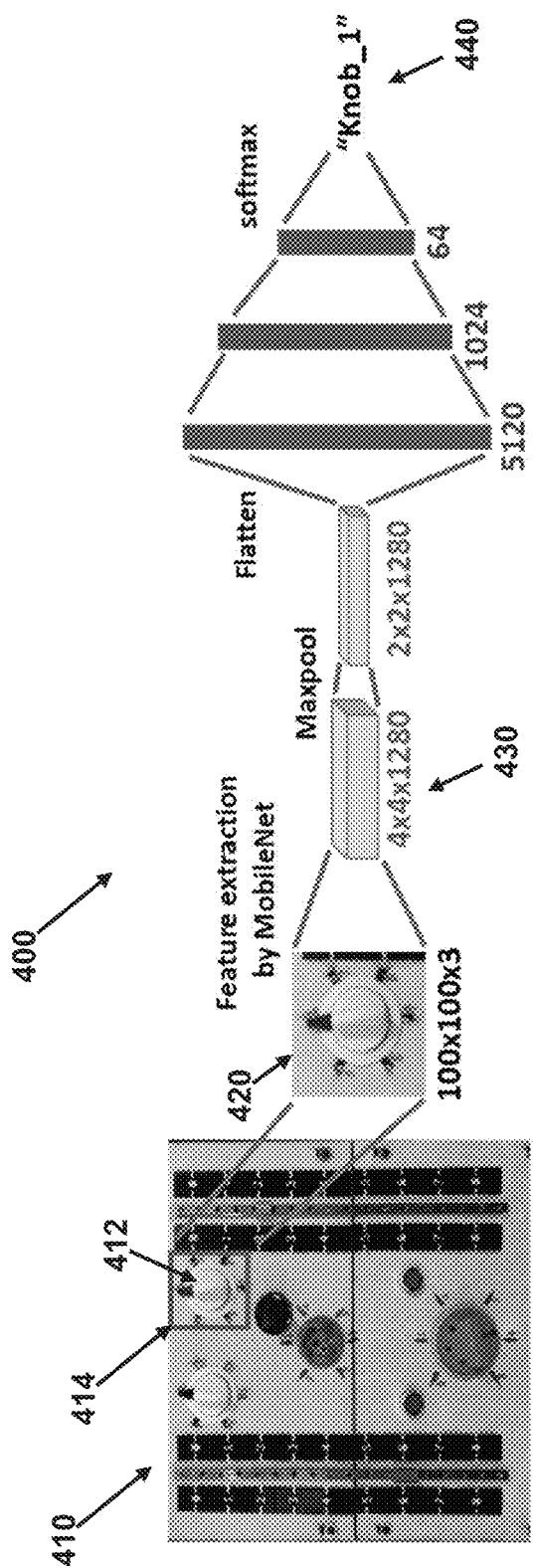
FIG. 7 shows an exemplary Convolutional Neural Network model for predicting a state of a component of an exemplary machine.

FIG. 7 shows an exemplary Convolutional Neural Network (CNN) model 400 for predicting the state of a component of an exemplary machine 410. It will, of course, be appreciated by those of ordinary skill in the art that a CNN model is one type of machine learning model. The exemplary machine 410 includes a several knobs including a respective knob 412, around which a bounding box 414 is defined. The CNN model 400 receives a cropped image 420 that encompasses the knob 412 as input. One or more convolutional layers (e.g., MobileNet or similar network) extract a feature set 430. One or more max pooling and flattening layers are applied to the feature set 430 before applying a softmax layer to output a predicted state 440 of the respective knob 412 (e.g., "Knob_1"). In the example of FIG. 7, the predicted state 440 of the respective knob 412 is a predicted rotation/position/orientation of the knob 412 indicating a selection of a setting (e.g., a knob rotation corresponding to options 1-6)

Similar component state detection models can be trained for each component of the machine 40. As mentioned above, the component state detection models are trained during an initialization process that occurs for each machine 40, for example by the expert user 15. The machine task tutorial system 10 advantageously utilizes an efficient pipeline to collect a training dataset based on captured video using bounding boxes. If some components are identical, the expert user 15 only needs to collect dataset based on their type (e.g., knob, lever), rather than each individual components. First, the expert user sets a physical component to a specific state or sets multiple components to specific states, such as "1" for knob 412 in FIG. 7. Then, the expert user selects corresponding virtual model counterpart(s), and sets the state(s) to match the physical components(s), and starts capturing video with the camera 29. The captured video is automatically cropped into RGB-D images based on the bounding boxes around each component and the cropped images are automatically labelled with the current states and component types. To make the dataset comprehensive, the expert user 15 needs to view the components from various heights, places, and angles during the video capture. This process is repeated for each possible state of each component of the machine 40. The images from the captured video (labeled with the corresponding component states) are used to train each of the component state detection models.

As noted above, the low-level states that are monitored by the AR system 20 may include (2) a state of the trainee user 15. As used herein, the "state" of a user refers to any classification of what the user is doing. In some embodiments, these possible states may include (i) a classification of whether the trainee user 15 is interacting with a component of the machine 40, (ii) a classification of whether the trainee user 15 is navigating the environment 50 or changing perspective of the environment 50, and (iii) a classification of whether the trainee user 15 is statically observing the machine 40 or the environment 50. In at least some embodiments, the processor 25 is configured to classify the state of the trainee user 15 based on the monitored motions of the first person.

In some embodiments, the processor 25 determines and/or classifies (i) whether the trainee user 15 is interacting with a component of the machine 40. To classify whether the trainee user 15 is interacting with a component of the machine 40, the processor 25 determines whether the trainee user 15 is touching a physical component of the machine 40 or not. For all visible machine components, the processor 25 (i) crops the images received from the camera 29 based on the 2D bounding boxes of the visible components of the machine 40, (ii) groups them into a batch, and (iii) predicts touching of each of the visible machine components in parallel using one or more component interaction detection models. If any component is being touched by the trainee user 15, the processor 25 determines the trainee user 15 is interacting with a component of the machine 40.

In at least one embodiment, the component interaction detection models are machine learning models, which are trained to predict whether the trainee user 15 is touching each component. In one embodiment, one or more of the component interaction detection models are CNN models, similar to the CNN model 400 for detecting component states. This component interaction detection models are trained in a similar manner as the component state detection models, discussed above, except that instead of setting the state of a component, the user needs to act out two interaction states, including "hand not touching" and "hand touching," during video capture for each component. The images from the captured video are cropped by the bounding boxes of each component, and the cropped images are used to train the component interaction detection models.

In some embodiments, the processor 25 determines and/or classifies (ii) whether the trainee user 15 is navigating the environment 50 or changing perspective of the environment 50 (i.e. moving through the environment or moving their head to view different parts of the environment 50) and/or (iii) whether the trainee user 15 is statically observing the machine 40 or the environment 50 (i.e., not moving through the environment 50 or moving their head to view different parts of the environment 50). In one embodiment, the processor 25 predicts the user's state of navigation or static observation based on the position and orientation of the AR headset 23 using a pre-trained Support Vector Machine (SVM) model. SVMs have demonstrated high performance when applied to human and animal activity recognition tasks. The processor 25 calculates a feature vector by taking a magnitude difference between kth and $0^{th}$ motion frames in a time sequence of motion within a window (k=0, . . . , windowSize) for the trainee user's head position (which may be represented as an $\mathbb{R}^3$ vector) and head orientation (which may be represented as an $\mathbb{R}^4$ vector). If an absolute magnitude difference is greater than a threshold, the processor 25 sets the features describing changes in the head position and orientation to true (indicating that the trainee user 15 is navigating the environment 50 or changing perspective of the environment 50). Optimal magnitude thresholds can be determined by grid search. Samples can be generated for these two states in which each sample lasts, for example, about 10-20 s. By performing a grid search, the features can be extracted using a window size of 1.3 s with an overlap of 0.56 s (stride).

Finally, as noted above, the low-level states that are monitored by the AR system 20 may include (3) a state indicating whether the trainee user 15 is looking at the region of interest for the current step of the machine task. In particular, the processor 25 determines whether the trainee user 15 is looking at a region of interest for the particular step in the plurality of steps of the machine task that is currently being performed. The region of interest for each particular step of the machine task is defined in the tutorial data that was recorded by the expert user. In particular, the region of interest is region including a target component that is to be manipulated for a respective step or including the AR avatar representing the human motions to be performed for the respective step.

To classify whether the trainee user 15 is looking within the region of interest or outside of the region of interest, processor 25 determines or retrieves the location of the target component and/or the AR avatar for the particular step, and then computes whether the target component and/or the AR avatar for the particular step are visible by the trainee user 15. In other words, the processor checks whether the target component and/or the AR avatar for the particular step is within the field of view of the AR headset 23. The processer 25 determines that the trainee user 15 is looking at the region of interest for the current step of the machine task in response to the target component or the AR avatar for the particular step being within the field of view of the AR headset 23. The processer 25 determines that the trainee user 15 is not looking at the region of interest in response to the target component and the AR avatar not being within the field of view of the AR headset 23.

The method 100 continues with evaluating the performance of the machine task by the first person based on the monitored motions of the first person and the monitored states of the machine (block 140). Particularly, the processor 25 evaluates the performance of the machine task by the trainee user 15 based on the monitored motions of the first person and/or the monitored states of the machine. More particularly, the processor 25 evaluates the performance of the machine task by the trainee user 15 based on the monitored 'low-level' states including (1) the monitored state of each component of the machine 40, (2) the monitored state of the trainee user 15, and (3) the monitored state indicating whether the trainee user 15 is looking at the region of interest for the current step of the machine task.

In the evaluation of the performance of the machine task by the trainee user 15, the processor 25 estimates a 'higher-level' state of the trainee user 15. In particular, the processor 25 combines the 'low-level' state information with one or more timers to determine a higher-level state of the trainee user 15 that describes how the trainee user 15 is performing and/or progressing through the machine task, in general determining whether the trainee user 15 is stuck or not. This higher-level state of the trainee user 15 is used to increase or decrease a level of detail of the graphical tutorial elements displayed to the trainee user 15 during the recorded tutorial.

In some embodiments, the processor 25 evaluates whether the trainee user 15 is in one of a plurality of higher-level states/scenarios indicating that the trainee user 15 is having trouble with the current step of the machine task or, in other words, that the trainee user 15 is stuck. In particular, the processor 25 considers four possible higher-level states/scenarios in which the trainee user 15 may need graphical tutorial elements with a higher level of detail: (S1) the trainee user 15 is unaware of the target component for the current step, (S2) the trainee user 15 is unaware of the expected operation or component manipulation for the current step, (S3) the trainee user 15 is interacting with the wrong component for the current step, and (S4) the trainee user 15 is interacting with the correct target component for the current step, but has been interacting for too long without setting the target component to the expected target state.

As discussed below, if the processor 25 detects that the trainee user 15 is in one of these higher-level states/scenarios indicating that the trainee user 15 is stuck, then the level of detail of the graphical tutorial elements is increased for the target component or target component interaction (for both the current step and any other steps involving the same target component or target component interaction). Conversely, if the trainee user 15 finishes a without being in one of those in one of these higher-level states (i.e., without being stuck), then the level of detail of the graphical tutorial elements is decreased for the target component or target component interaction that was involved in the completed step.

In at least some embodiments, the processor 25 evaluates the performance using a finite state machine having a plurality of states. Particularly, the processor 25 operates the finite state machine (i.e., to transition between the finite states thereof) based on the monitored motions of the first person and the monitored states of the machine. More particularly, the processor 25 operates the finite state machine based on the 'low-level' states including (1) the states of each component of the machine 40, (2) the states of the trainee user 15, and (3) the states indicating whether the trainee user 15 is looking at the region of interest for the current step of the machine task. For at least some of the finite states, if the trainee user 15 stays in a respective one of the finites state for longer than a respective threshold amount of time, then the processor 25 determines that the trainee user 15 is stuck in the performance of the machine task, for example according to one of the four higher-level states/scenarios discussed above (S1), (S2), (S3), and (S4).

Figure 8:
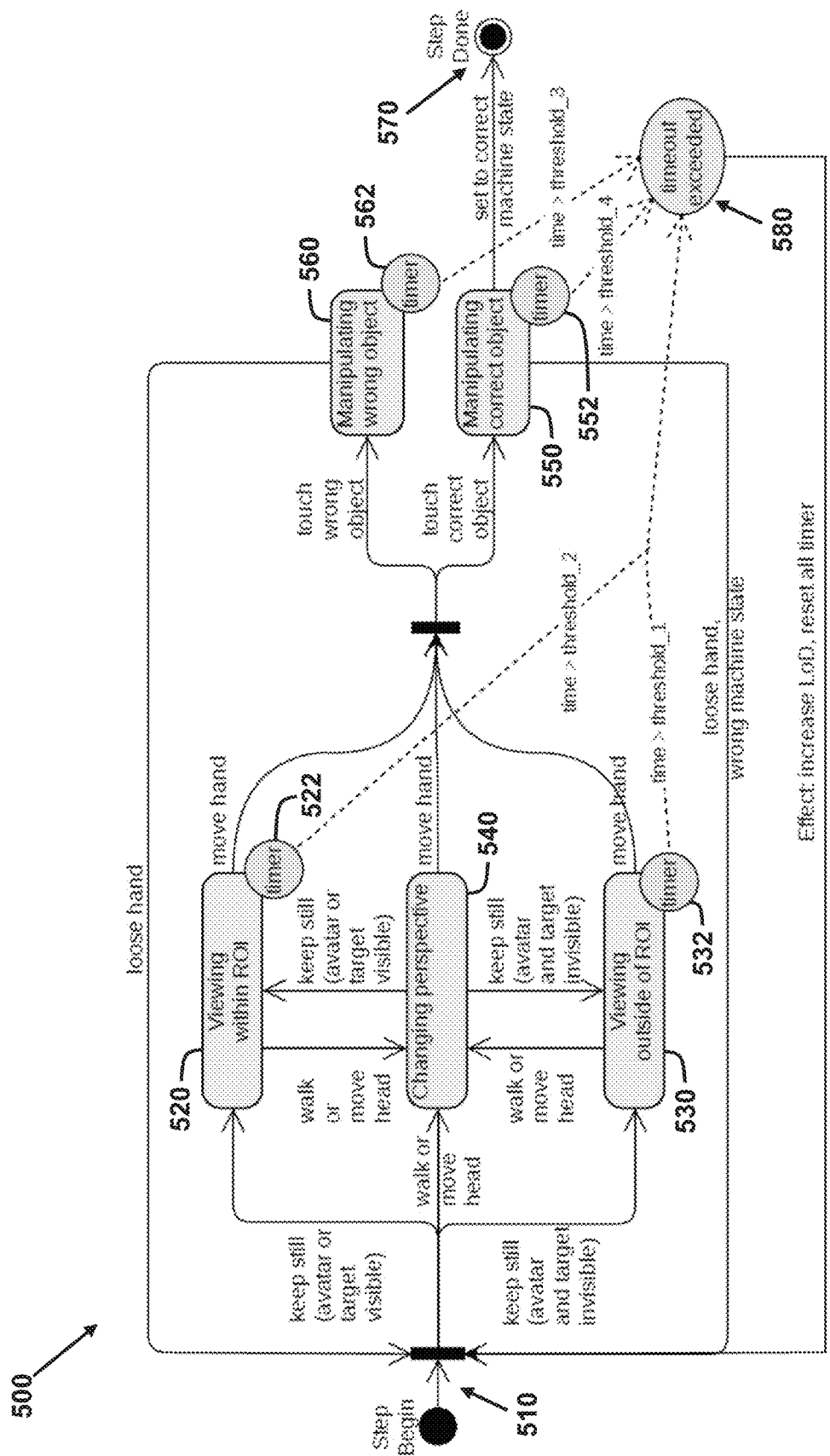
FIG. 8 shows an exemplary finite state machine for evaluating a performance of each step of a machine task by a trainee user and adjusting a level of detail of the graphical tutorial elements.

FIG. 8 shows an exemplary finite state machine 500 for evaluating a performance of each step of a machine task by the trainee user 15 and adjusting a level of detail of the graphical tutorial elements. At the beginning 510 of a respective step of the machine task, the current state of the trainee user 15 user immediately transits into one of three finite states: (1) a first finite state 520 indicating that the trainee user 15 is statically viewing the region of interest for the current step (e.g., the "Viewing within ROI" state), (2) a second finite state 530 indicating that the trainee user 15 is statically viewing outside the region of interest for the current step (e.g., the "Viewing outside of ROI" state), and (3) a third finite state 540 indicating that the trainee user 15 is currently navigating the environment 50 or changing perspective of the environment 50 (e.g., the "Changing perspective" state).

From the beginning 510 of a respective step of the machine task, the processor 25 transitions the finite state machine 500 to the first finite state 520 (i.e., the "Viewing within ROI" state) in response to determining that the trainee user 15 (1) is statically observing the machine 40 or the environment 50 and (2) is looking within the region of interest for the current step. Similarly, the processor 25 transitions the finite state machine 500 to the second finite state 530 (i.e., the "Viewing outside of ROI" state) in response to determining that the trainee user 15 (1) is statically observing the machine 40 or the environment 50 and (2) is not looking within the region of interest for the current step. Finally, the processor 25 transitions the finite state machine 500 to the third finite state 540 (i.e., the "Changing perspective" state) in response to determining that the trainee user 15 is navigating the environment 50 and/or changing perspective of the environment 50.

Starting from the third finite state 540 (i.e., the "Changing perspective" state), the processor 25 transitions the finite state machine 500 to the first finite state 520 in response to determining that the trainee user 15 (1) is statically observing the machine 40 or the environment 50 and (2) is looking within the region of interest for the current step. Likewise, the processor 25 transitions the finite state machine 500 from third finite state 540 to the second finite state 530 in response to determining that the trainee user 15 (1) is statically observing the machine 40 or the environment 50 and (2) is not looking within the region of interest for the current step.

Starting from either of the first finite state 520 (i.e., the "Viewing within ROI" state) and the second finite state 530 (i.e., the "Viewing outside of ROI" state), the processor 25 transitions the finite state machine 500 to the third finite state 540 in response to determining that the trainee user 15 is navigating the environment 50 or changing perspective of the environment 50.

With continued reference to FIG. 8, in addition to first three finite states 520, 530, and 540, the finite state machine 500 includes two further finite states: (4) a fourth finite state 550 indicating that the trainee user 15 is interacting with a target component of the machine 40 for the current step (e.g., the "Manipulating correct object" state), and (5) a fifth finite state 560 indicating that the trainee user 15 is interacting with a component of the machine 40 that is not the target component for the current step (e.g., the "Manipulating wrong object" state).

Starting from any of the first three finite states 520, 530, and 540 (i.e., the "Viewing within ROI" state, the "Viewing outside of ROI" state, or the "Changing perspective" state), the processor 25 transitions the finite state machine 500 to the fourth finite state 550 (i.e., the "Manipulating correct object" state) in response to determining that the trainee user 15 is interacting with (i.e., touching) the target component of the machine 40 for the current step. Likewise, the processor 25 transitions the finite state machine 500 to the fifth finite state 560 (i.e., the "Manipulating wrong object" state) in response to determining that the trainee user 15 is interacting with a component of the machine 40 that is not the target component for the current step.

Starting from the fifth finite state 560 (i.e., the "Manipulating wrong object" state), the processor 25 transitions the finite state machine 500 back to the beginning 510 in response to determining that the trainee user 15 has stopped interacting with the wrong component and/or stopped interacting with any component of the machine 40. From the beginning 510, the processor 25 transitions the finite state machine 500 into one of three finite states into one of the first three finite states 520, 530, and 540, in the same manner discussed above.

Starting from the fourth finite state 550 (i.e., the "Manipulating correct object" state), the processor 25 transitions the finite state machine 500 back to the beginning 510 in response to determining that (1) the trainee user 15 has stopped interacting with the target component and/or stopped interacting with any component of the machine 40, and (2) that target component is not in the target state for the current step. From the beginning 510, the processor 25 transitions the finite state machine 500 into one of the first three finite states 520, 530, and 540, in the same manner discussed above.

Alternatively, starting from the fourth finite state 550 (i.e., the "Manipulating correct object" state), the processor 25 transitions the finite state machine 500 to the end 570 of the step in response to determining that (1) the trainee user 15 has stopped interacting with the target component and/or stopped interacting with any component of the machine 40, and (2) that target component is now in the target state for the current step. At the end 570, the processor 25 transitions the finite state machine 500 back to the beginning 510 and triggers a decrease in the level of detail of the graphical tutorial elements relating to the target component or target component interaction of the current step. Next, the processor 25 operates the finite state machine 500 again for the next step in the plurality of steps of the machine task. Once there are no steps left, the tutorial ends.

With continued reference to FIG. 8, the finite state machine 500 also includes timers 522, 532, 542, and 552 configured to measure an accumulated time that the trainee user 15 spends in the first finite state 520, the second finite state 530, the fourth finite state 550, and the fifth finite state 560, respectively. Each of the timers 522, 532, 542, and 552 is independent and resets at the beginning of each step (alternatively, the timers 522, 532, 542 might reset each time the finite state machine 500 transitions to the corresponding finite state). When a trainee user 15 transits from one finite state to another, the timer of the previous state pauses while the timer of the new state starts ticking. In each case, if the accumulated time measured by the timer exceeds a respective threshold amount of time, then a timeout 580 is triggered and the processor 25 (i) operates the finite state machine 500 to return to the beginning 510, (ii) triggers an increase in the level of detail of the graphical tutorial elements relating to the target component or target component interaction of the current step, and (iii) resets all of the timers 522, 532, 542, and 552.

For the first higher-level state/scenario (S1) detection, the processor 25 determines that the trainee user 15 is stuck in the performance of the machine task in response to the trainee user 15 looking away from the region of interest for longer than a first threshold amount of time threshold$_1$ (measured by the timer 532 of the second finite state 530, i.e., the "Viewing outside of ROI" state), without interacting with any components of the machine. In this case, it is inferred that the trainee user 15 is unaware of the target component for the current step.

For the second higher-level state/scenario (S2) detection, the processor 25 determines that the trainee user 15 is stuck in the performance of the machine task in response to the trainee user 15 looking at the region of interest for longer than a second threshold amount of time threshold$_2$ (measured by the timer 522 of the first finite state 520, i.e., the "Viewing within ROI" state), without interacting with any components of the machine. In this case, it is inferred that the trainee user 15 is unaware of the expected operation or component manipulation for the current step.

For the third higher-level state/scenario (S3) detection, the processor 25 determines that the trainee user 15 is stuck in the performance of the machine task in response to trainee user 15 interacting with a component that is not a target component of the machine for a current step in the plurality of steps of the machine task for longer than a third threshold amount of time threshold$_3$ (measured by the timer 562 of the fourth finite state 560, i.e., the "Manipulating wrong object" state). In this case, it is inferred that the trainee user 15 is unaware of the target component for the current step.

For the fourth higher-level state/scenario (S4) detection, the processor 25 determines that the trainee user 15 is stuck in the performance of the machine task in response to the trainee user 15 interacting with a target component of the machine for the current step in for longer than a fourth threshold amount of time threshold$_4$ (measured by the timer 552 of the third finite state 550, i.e., the "Manipulating correct object" state), without setting a state of the target component to a target state. In this case, it is inferred that the trainee user 15 is unaware of the expected target state of the target component for the current step.

It is important to find the proper threshold for each of the four higher-level states/scenarios (S1), (S2), (S3), and (S4). Firstly, it should be appreciated the type of machine task type matters for selecting the proper thresholds. The time spent in static observation, navigation, and interaction varies with task type, respectively. For example, a local task may involve little navigation and mostly interaction, such that the states related to manipulating objects may need a larger threshold. On the other hand, a spatial task may require much shorter interaction time but a longer navigation time. Therefore, the thresholds should refer to the actual time spent in each step by the expert user. Secondly, the threshold of each of the four higher-level states/scenarios may be different from one another. For example, the threshold associated with the first finite state 520 (i.e., the "Viewing within ROI" state) might be larger than that of the second finite state 530 (i.e., the "Viewing outside of ROI" state) because it allows more time for the user to understand, remember, or recall the tutoring content. Lastly, the current level of detail of the graphical tutorial elements matters for selecting the proper thresholds. Particularly, the amount of time users need at lower level of detail may be different than amount of time users need at higher level of detail.

To this end, in one embodiment, let threshold$_{ij}$ denote the threshold for step i and state j:

threshold$_{ij}$=$f_j$(currentLoD$_i$,referenceTimes$_i$), where referenceTimes$_i$ is a set of times that an expert user spent in step i while authoring the tutorial (including static, navigation and interaction time as well as their total time), which acts as the reference time for the trainee user, and where currentLoD$_i$ is the current level of detail (e.g., a value between 1 and 5, as discussed below). For different finite states, different times from referenceTimes$_i$ may be used.

Returning to FIG. 4, the method 100 continues with adapting a level of detail of the graphical tutorial elements in the graphical user interface based on the evaluation of the performance of the machine task by the first person (block 150). Particularly, the processor 25 adapts a level of detail of the graphical tutorial elements in the AR graphical user interface based on the evaluation of the performance of the machine task by the trainee user 15. By default, the trainee user 15 starts with a highest level of detail in which they are given all of the types of graphical tutorial elements to guide them in operating the machine 40. Since the trainee user 15 may need to repeat the tutorial for multiple trials before comprehending it, the processor 25 keeps adapting the graphical tutorial elements for each step based on their historical learning progress and the current behavior.

In some embodiments, the processor 25 increases the level of detail by increasing a number of graphical tutorial elements that are displayed with respect to a particular component of the machine 40 in response to determining that the trainee user 15 is stuck in the performance of the machine task during a step involving the particular component. In other words, when one of the four higher-level states/scenarios (S1), (S2), (S3), and (S4) are detected by the finite state machine 500 indicating that the trainee user 15 is stuck, the processor 25 increases the number of graphical tutorial elements displayed with respect to the particular component. The level of detail of graphical tutorial elements for the particular component is updated and stored in the memory 26 in association with the respective trainee user 15 as historical level of detail data.

In some embodiment, the processor 25 decreases the level of detail by decreasing a number of graphical tutorial elements that are displayed with respect to a particular component of the machine in response to the trainee user 15 completing a step of the machine task that involved the particular component. In other words, when completion of the current step is detected by the finite state machine 500 at the end 570, the processor 25 decreases the number of graphical tutorial elements displayed with respect to the particular component. The level of detail of graphical tutorial elements for the particular component is updated and stored in the memory 26 in association with the respective trainee user 15 as historical level of detail data.

In light of the above, it should be appreciated that the level of detail of the graphical tutorial elements is determined on a component-by-component basis or component interaction-by-component interaction basis, not on a step-by-step basis. This is because a particular component or particular type of component interaction may be involved in multiple steps of the same recorded tutorial. Additionally, a particular component or particular type of component interaction may be shared by multiple recorded tutorials that involve the same machine 40. Therefore, binding the level of detail to a particular component or to a particular type of component interaction rather than to a step supports better incorporates of the trainee user's learning history. To this end, at the beginning of each step, the processor 25 loads the historical level of detail for the target component or target component interaction that is involved with the respective step from the memory 26. Here, the processor 25 only loads the most recent level of detail for the target component or target component interaction, and ignores the older levels of detail data, if any. If there are no historical levels of detail data, the processor 25 shows the step with a default level of detail (e.g., a highest level of detail, LoD 5 as discussed below).

FIG. 9 shows a table summarizing the types of graphical tutorial content displayed for five distinct levels of detail. Each type graphical tutorial element serves a different role in conveying information, and further indicates that their necessity varies at different stages of the learning process. Each distinct level of detail utilizes a unique set of graphical tutorial element types. In the illustrated example, the graphical tutorial elements are organized into five levels of detail (LoDs). At LoD 5, the processor 25 operates the display screen 28 to show all four types of graphical tutorial elements, i.e., subtask descriptions, step expectation descriptions, animated components with guidance arrows, and AR avatars. At LoD 4, the processor 25 operates the display screen 28 to hide and/or exclude the AR avatar, compared LoD 5, such that only the subtask descriptions, the step expectation descriptions, and the animated components with guidance arrows are shown. At LoD 3, the processor 25 operates the display screen 28 to further hide and/or exclude the animated components and guidance arrows, compared LoD 4, such that only the subtask descriptions and the step expectation descriptions are shown. At LoD 2, the processor 25 operates the display screen 28 to further hide and/or exclude the step expectation descriptions, compared to LoD 3, such that only the subtask descriptions are shown. Finally, at LoD 1, the processor 25 operates the display screen 28 to show none of the graphical tutorial elements.

As should now be appreciated, when the level of detail decreases, the graphical tutorial elements are hidden gradually and the difficulty for the user increases since there is less tutorial guidance. For example, at LoD 1 and LoD 2, the trainee user 15 does not get direct hints about what target component to be operated or what target state to set the target component to, which forces the trainee user 15 to recall the details instead of being informed directly. Trainee users 15 who have gone through the same operations multiple times may not need the detailed information provided in higher levels of detail.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for providing tutorial guidance for performing a machine task, the method comprising:
   storing, in a memory, tutorial data defining a plurality of steps of a machine task, the plurality of steps including interactions with a machine in an environment;
   displaying, on a display, an augmented reality graphical user interface including graphical tutorial elements that convey information regarding the plurality of steps of the machine task, the graphical tutorial elements being superimposed on at least one of (i) the machine and (ii) the environment;
   monitoring, with at least one sensor, motions of a first person and states of the machine during a performance of the machine task by the first person by (i) detecting a position of a respective component of the machine in the environment, (ii) determining a bounding box in an image that encompasses the respective component of the machine within the image based on the position of the respective component of the machine, and (iii) determining a state of the respective component using a machine learning model based on the image cropped by the bounding box;
   determining, with a processor, during a performance of a respective step of the plurality of steps involving a respective component of the machine, that the first person is stuck in the performance of the respective step based on the monitored motions of the first person and the monitored states of the machine; and
   increasing, with the processor, a level of detail of the graphical tutorial elements in the graphical user interface that are displayed with respect to the respective component in response to determining that the first person is stuck in the performance of the machine task.

2. The method of claim 1, wherein the graphical tutorial elements include a virtual representation of a human that is animated to show a human motion required to perform at least one of the plurality of steps of the machine task.

3. The method of claim 1, wherein the graphical tutorial elements include a virtual representation of a component of the machine that is animated to show a manipulation of the component required to perform at least one of the plurality of steps of the machine task.

4. The method of claim 3, wherein the graphical tutorial elements include a virtual arrow superimposed in the environment to indicate a direction of the manipulation of the component required to perform the at least one of the plurality of steps of the machine task.

5. The method of claim 1, wherein the graphical tutorial elements include at least one of (i) a text description and (ii) a graphical representation of an expected outcome of a respective step in the plurality of steps of the machine task.

6. The method of claim 1, wherein the graphical tutorial elements include at least one of (i) a text description and (ii) a graphical representation of an expected outcome of a respective group of consecutive steps in the plurality of steps of the machine task.

7. The method according to claim 1, the monitoring further comprising:
determining whether the first person is looking at a region of interest for a particular step in the plurality of steps of the machine task, the region of interest being defined in the tutorial data.

8. The method according to claim 7, the determining that the first person is stuck in the performance respective step further comprising:
determining that the first person is stuck in response to the first person looking away from the region of interest for longer than a first threshold amount of time, without interacting with any components of the machine.

9. The method according to claim 7, the determining that the first person is stuck in the performance respective step further comprising:
determining that the first person is stuck in response to the first person looking at the region of interest for longer than a second threshold amount of time, without interacting with any components of the machine.

10. The method of claim 1, the monitoring the motions of the first person further comprising:
classifying a current state of the first person based on the monitored motions of the first person.

11. The method of claim 10, the classifying the current state of the first person further comprising at least one of:
determining whether the first person is changing perspective of the environment; and
determining whether the first person is statically observing the environment.

12. The method of claim 10, the classifying the current state of the first person further comprising at least one of:
determining whether the first person is interacting with a component of the machine.

13. The method according to claim 12, the determining that the first person is stuck in the performance respective step further comprising:
determining that the first person is stuck in response to the first person interacting with a component that is not the respective component of the machine for longer than a third threshold amount of time.

14. The method according to claim 12, the determining that the first person is stuck in the performance respective step further comprising:
determining that the first person is stuck in response to the first person interacting with the respective component of the machine for longer than a fourth threshold amount of time, without setting a state of the respective component to a target state.

15. The method according to claim 1, the determining that the first person is stuck in the performance respective step further comprising:
operating a finite state machine having a plurality of states based on the monitored motions of the first person and the monitored states of the machine; and
determining that the first person is stuck in response to the finite state machine remaining at a respective state in the plurality of states of the state machine for longer than a respective threshold amount of time.

16. The method according to claim 1, the increasing the level of detail of the graphical tutorial elements further comprising:
increasing, in the graphical user interface, a number of graphical tutorial elements that are displayed with respect to the respective component of the machine.

17. The method according to claim 1 further comprising:
decreasing, in the graphical user interface, a number of graphical tutorial elements that are displayed with respect to respective component of the machine in response to the first person completing the respective step in the plurality of steps of the machine task that involved the respective component.

18. The method of claim 1, wherein the tutorial data was previously recorded and generated by a second person.

19. An augmented reality device for providing tutorial guidance for performing a machine task, augmented reality device comprising:
a memory configured to store tutorial data defining a plurality of steps of a machine task, the plurality of steps including interactions with a machine in an environment;
a display screen configured to display an augmented reality graphical user interface including graphical tutorial elements that convey information regarding the plurality of steps of the machine task, the graphical tutorial elements being superimposed on at least one of (i) the machine and (ii) the environment;
at least one sensor configured to measure sensor data; and
a processor operably connected to the memory, the display screen, and the at least one sensor, the processor being configured to:
monitor, based on the sensor data, motions of a first person and states of the machine during a performance of the machine task by the first person by (i) detecting a position of a respective component of the machine in the environment, (ii) determining a bounding box in an image that encompasses the respective component of the machine within the image based on the position of the respective component of the machine, and (iii) determining a state of the respective component using a machine learning model based on the image cropped by the bounding box;
determine, during a performance of a respective step of the plurality of steps involving a respective component of the machine, that the first person is stuck in the performance of the respective step based on the monitored motions of the first person and the monitored states of the machine; and
operate the display screen to increase a level of detail of the graphical tutorial elements in the graphical user interface that are displayed with respect to the respective component in response to determining that the first person is stuck in the performance of the machine task.

* * * * *